US011140897B2

(12) United States Patent
Rademacher et al.

(10) Patent No.: US 11,140,897 B2
(45) Date of Patent: Oct. 12, 2021

(54) LIQUID-CORE CAPSULES FOR PEST CONTROL

(71) Applicant: Katz Biotech AG, Baruth/Mark (DE)

(72) Inventors: Joerg Rademacher, Berlin (DE); Peter Katz, Berlin (DE); Diana Koehler, Baruth (DE); Markus Hellmund, Berlin (DE)

(73) Assignee: Katz Biotech AG, Baruth/Mark (DE)

( * ) Notice: Subject to any disclaimer, the term of this patent is extended or adjusted under 35 U.S.C. 154(b) by 785 days.

(21) Appl. No.: 15/779,212

(22) PCT Filed: Dec. 9, 2016

(86) PCT No.: PCT/DE2016/000430
§ 371 (c)(1),
(2) Date: May 25, 2018

(87) PCT Pub. No.: WO2017/097282
PCT Pub. Date: Jun. 15, 2017

(65) Prior Publication Data
US 2021/0204542 A1      Jul. 8, 2021

(30) Foreign Application Priority Data

Dec. 11, 2015    (DE) .................... 10 2015 016 114.8

(51) Int. Cl.
| | | |
|---|---|---|
| *A01N 25/00* | (2006.01) | |
| *A01N 27/00* | (2006.01) | |
| *A01N 31/02* | (2006.01) | |
| *A01N 35/02* | (2006.01) | |
| *A01N 25/28* | (2006.01) | |
| *A01N 37/02* | (2006.01) | |
| *A01N 37/06* | (2006.01) | |

(52) U.S. Cl.
CPC ........... *A01N 25/28* (2013.01); *A01N 25/002* (2013.01); *A01N 27/00* (2013.01); *A01N 31/02* (2013.01); *A01N 35/02* (2013.01); *A01N 37/02* (2013.01); *A01N 37/06* (2013.01)

(58) Field of Classification Search
CPC ...... A01N 25/28; A01N 25/002; A01N 27/00; A01N 31/02; A01N 35/02; A01N 37/02; A01N 37/06
See application file for complete search history.

(56) References Cited

U.S. PATENT DOCUMENTS

| | | | |
|---|---|---|---|
| 6,395,776 B1 | 5/2002 | Loesel et al. | |
| 2002/0050659 A1 | 5/2002 | Toreki et al. | |
| 2011/0165115 A1 | 7/2011 | Zhang et al. | |

FOREIGN PATENT DOCUMENTS

| | | |
|---|---|---|
| DE | 195 28 529 A1 | 2/1997 |
| DE | 697 23 122 T2 | 5/2004 |
| DE | 10 2005 056 795 A1 | 6/2007 |
| DE | 10 2010 033048 A1 | 2/2012 |
| DE | 11 2010 005 095 T5 | 10/2012 |
| EP | 0 937 392 A1 | 8/1999 |
| EP | 0 782 883 B1 | 7/2003 |
| EP | 2 415 356 B1 | 5/2013 |
| EP | 2 684 600 A1 | 1/2014 |
| WO | 90/00005 A1 | 1/1980 |
| WO | 96/03041 A1 | 2/1996 |
| WO | 2015/073439 A1 | 5/2015 |

OTHER PUBLICATIONS

International Search Report of PCT/DE2016/000430, dated Mar. 16, 2017.
Hiltpold et al., Capsules containing entomopathogenic nematodes as a Trojan horse approach to control the western corn rootworm, Plant Soil, May 5, 2012, 15 pages.
Dara, p. (2013): Biological and Microbial Control Options for Managing Lygus Bug in Strawberries. Lygus Bug IPM Seminar, UCCE, Watsonville, Apr. 18, 2013, 36 pages, http://cesantabarbara.ucanr.edu/files/165601.pdf.
Paré, P. W. & Tumlinson J. H. (1999): Plant Volatiles as a Defense against Insect herbivores. Plant Physiology, Oct. 1999, vol. 121, pp. 325-331.
Frati F. et al: Role of the plant—conspecific complex in host location and intra-specific communication of Lygus rugulipennis. Physiol. Entomol. (2008) 33, 129-137.
Holopainen, J.K. & Varis, A.-L. 1991: Host Plants of the European tarnished plant bug *Lygus rugulipennis*. J. Appl. Ent. 111 (1991), pp. 484-498.
Dragland, S. Lygus rugulipennis, a harmful insect to many cultivated plants—II. Damage in cabbage fields and control measures Håret entege. II Skadar i kålfelt (1991), pp. 67-76.
Bech, R. 1967: Zur Bedeutung der Lygus-Arten als Pflanzenschädlinge, Biologisches Zentralblatt, 1967, pp. 205-232.
M. Borges, "Attractant compounds of the southern green stink bug, *Nezara viridula* (L.) (Heteroptera: Pentatomidae)." Anais da Sociedade Entomólogica do Brasil 1995 vol. 24, No. 2 pp. 215-225 ref. 18 English Abstract only.
J.R. Aldrich et al., "Pentatomid Natural Products Chemistry and Morphology of the III-IV Dorsal Abdominal Glands of Adults" J. Chem. Ecol, 1978, vol. 4, No. 2, pp. 161-172 (12 pages).
J.R. Aldrich et al., "Rapid Communication Pheromone Strains of the Cosmopolitan Pest, *Nezara viridula* (Heteroptera: Pentatomidae)" The Journal of Experimental Zoology vol. 244, pp. 171-175 (1987) (5 pages).
J.R. Aldrich et al., "Pheromone Blends of Green Stink Bugs and Possible Parasitoid Selection" Naturwissenschaften vol. 76, pp. 173-175 (1989) (3 pages).
Jeffrey R. Aldrich et al., "Methyl 2,4,6-decatrienoates Attract Stink Bugs and Tachinid Parasitoids" J Chem Ecol (2007) vol. 33, pp. 801-815 (15 pages).

(Continued)

*Primary Examiner* — Alma Pipic
(74) *Attorney, Agent, or Firm* — Collard & Roe, P.C.

(57) ABSTRACT

Liquid-core capsules (10) for pest control are provided, wherein the liquid-core capsules (10) have an aqueous core (11) and a diffusion-inhibiting, functional outer shell (13). The core (11) contains at least one pest control agent. The outer shell (13) contains at least one attractant for the pests.

15 Claims, 9 Drawing Sheets

(56) References Cited

OTHER PUBLICATIONS

Figure 1:
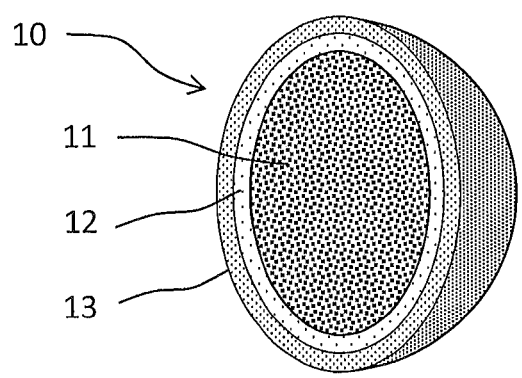

Raymond Baker et al., "Identification and Synthesis of (Z)-(1'S,3'R,4'S)(-)-2-(3',4'-Epoxy-4'-methylcyclohexyl)-6-methylhepta-2,5-diene, the Sex Pheromone of the Southern Green Stinkbug, *Nezara viridula* (L.)" J. Chem. Soc., Chem. Commun., 1987, pp. 414-416 (3 pages).

M. Borges et al., "Field responses of stink bugs to the natural and synthetic pheromone of the Neotropical brown stink bug, *Euschistus heros* (Heteroptera: Pentatomidae)" Physiological Entomology (1998), vol. 23, pp. 202-207 (6 pages).

Patrick Brézot et al., "Bisabolene Epoxides in Sex Pheromone in *Nezara viridula* (L.) (Heteroptera: Pentatomidae): Role of cis Isomer and Relation to Specificity of Pheromone" Journal of Chemical Ecology, vol. 20, No. 12, 1994, pp. 3133-3147 (15 pages).

Carla F. Fávaro et al., "Rapid Communication Identification of (Z)-4- and 1-Tridecene in the Metathoracic Gland Secretions of Stink Bugs Employing the GC/FT-IR Technique" J Chem Ecol (2013) vol. 39, pp. 1182-1185 (4 pages).

Alessandro Fucarino et al., "Chemical and Physical Signals Mediating Conspecific and Heterospecific Aggregation Behavior of First Instar Stink Bugs" Journal of Chemical Ecology, vol. 30, No. 6, Jun. 2004, pp. 1257-1269 (13 pages).

A. R. Gilby et al., "The Composition of the Scent of the Green Vegetable bug, *Nezara viridula*" Proceedings of the Royal Society Proc. R. Soc. Lond. B 1965 vol. 162, pp. 105-120 (17 pages).

P. J. Innocenzi, et al., "Attraction of Male European Tarnished Plant Bug, *Lygus rugulipennis* to Components of the Female Sex Pheromone in the Field" Journal of Chemical Ecology, vol. 31, No. 6, Jun. 2005, pp. 1401-1413 (13 pages).

P. J. Innocenzi, et al., "Investigation of Long-Range Female Sex Pheromone of the European Tarnished Plant Bug, *Lygus rugulipennis*: Chemical, Electrophysiological, and Field Studies" Journal of Chemical Ecology, vol. 30, No. 8, Aug. 2004, pp. 1509-1529 (21 pages).

Ashot Khrimian, "The geometric isomers of methyl-2,4,6-decatrienoate, including pheromones of at least two species of stink bugs" Tetrahedron vol. 61, (2005), pp. 3651-3657 (7 pages).

Ashot Khrimian et al., "Field Trapping of the Invasive Brown Marmorated Stink Bug, *Halyomorpha halys*, with Geometric Isomers of Methyl 2,4,6-Decatrienoate" Journal of Agricultural and Food Chemistry J. Agric. Food Chem. 2008, vol. 56, pp. 197-203 (7 pages).

Junheon Kim et al., "A trap baited with multiple pheromones attracts sympatric hemipteran pests of sweet persimmon" Journal of Asia-Pacific Entomology vol. 18 (2015), pp. 465-470 (6 pages).

Sándor Koczor et al., "Attraction of *Lygus rugulipennis* and *Adelphocoris lineolatus* to synthetic floral odour compounds in field experiments in Hungary" Research Gate, Journal of Pest Science ISSN 1612-4758, vol. 85, No. 2, (2012) pp. 239-245 (10 pages).

Kyu-Chul Lee et al., "Seasonal Occurence Trends of Hemipteran Bug Pests Monitored by Mercury Light and Aggregation Pheromone Traps in Sweet Persimmon Orchards" Korean J. Appl. Entomol., vol. 41, No. 4, (2002), pp. 233-238 with English Abstract (6 pages).

Jeffrey A. Lockwood et al., "Defensive Secretion of the Southern Green Stink Bug (Hemiptera: Pentatomidae) as an Alarm Pheromone" Ann. Entomol. Soc. Am. vol. 80, pp. 686-691 (1987) (6 pages).

Dan Mu et al., "Behavioral responses for evaluating the attractiveness of specific tea shoot volatiles to the tea green leafhopper, *Empoaca vitis*" Insect Science (2012) vol. 19, pp. 229-238 (10 pages).

Takahiko Tsuyuki et al. "Stink Bug Aldehydes" Agricultural and Biological Chemistry vol. 29, No. 5, pp. 419-427, 1965 (10 pages).

J. R. Aldrich et al., "Artifacts and Pheromone Blends from *Nezara* spp. and Other Stink Bugs (Heteroptera: Pentatomidae)" Z. Naturforsch. vol. 48c, pp. 73-79 (1993) (7 pages).

Michelle Fountain et al., "Further Studies on Sex Pheromones of Female Lygus and Related Bugs: Development of Effective Lures and Investigation of Species-Specificity" J Chem Ecol (2014) vol. 40 pp. 71-83 (13 pages).

Ashot Khrimian et al., "Discovery of the Aggregation Pheromone of the Brown Marmorated Stink Bug (*Halyomorpha halys*) through the Creation of Stereoisomeric Libraries of 1-Bisabolen-3-ols" Journal of Natural Products American Chemical Society and American Society of Pharmacognosy, pubs.acs.org/jnp, pp. A-J (10 pages).

(a) female and (b) male *L. rugulipennis* to 0.1 µg/compound of different plant and insect odors (a)

(b)

(a) female and (b) male L. rugulipennis to 10 µg/compound of different plant and insect odors

LIQUID-CORE CAPSULES FOR PEST CONTROL

CROSS REFERENCE TO RELATED APPLICATIONS

This application is the National Stage of PCT/DE2016/000430 filed on Dec. 9, 2016, which claims priority under 35 U.S.C. § 119 of German Application No. 10 2015 016 114.8 filed on Dec. 11, 2015, the disclosure of which is incorporated by reference. The international application under PCT article 21(2) was not published in English.

The present invention relates to liquid-core capsules for pest control and to a method for producing such capsules and to a use in pest control. The invention furthermore relates to a carrier for controlled release of active substances.

Pest control has a major role in agricultural and horticultural crops. In particular, various insects and mites can cause significant damage in agricultural and horticultural endeavors. True bugs (e.g. *Lygus* ssp.) can cause significant damage in many vegetable crops and ornamental plants (e.g. tomatoes, cucumbers, peppers, eggplant, beans, lettuce, leafy vegetables, and stem-grown vegetables, in addition to cutting flowers such as *gerbera* daisies, chrysanthemums, and roses). Both the larva and the adults use their mouthparts to pierce the plants in order to suck out plant tissue or plant liquid for nutrition. The typical symptoms of damage form around the piercing site, in particular necroses, spots, and impaired growth. Generally blossoms and fruits are pierced and then die off or are seriously damaged. After being pierced, the fruits or ornamental plants are frequently no longer marketable. Moreover, the true bugs can transmit viruses and bacteria that are pathogenic for plants and that cause resultant damage, such as e.g. rot. There is therefore a significant need for treatment for pest control, especially with respect to vegetable production.

The special problem with pest control for true bugs is that in general the animals are very robust and therefore must absorb relatively high quantities of active substances before they die off. In principle this would be possible using oral ingestion of edible poisons (active substances). But for sucking pests like true bugs it would be necessary to add the active substances to the plant itself so that the poison could be sucked out and ingested. In addition, these types of true bugs suck all above-ground plant parts, so that a protection agent would ideally have to be distributed uniformly and at a high dose in all of the plant tissue in order for the agent to work well. Such edible poisons are not available, however, because they are not consistent with existing legal requirements (authorization, Regulation on Maximum Residue Levels). Therefore control of true bugs is currently only possible with relatively high-dose contact insecticides. Examples of such contact insecticides are synthetic pyrethroids and neonicotinoids. The adverse ecotoxicological profile of the contact insecticides is problematic. In addition, as a rule use of these insecticides is prohibited 14 to 7 days prior to harvest to protect the consumer. The active substances are also hazardous to bees. Use of such plant protection agents is therefore highly regulated. In addition, such chemical pest control is not sustainable, since resistances build up and beneficial organisms are also killed off. The continuous strong negative impact on the populations of beneficial organisms connected to such pest control frequently also means the end of beneficial integrated plant protection in which beneficial organisms are primarily used, their effect being supported by specific supplementing with gentle chemical plant protection agents.

The use of biological plant protection agents in pest control has not been successful in the past, since such substances are applied to surfaces and the true bugs do not ingest them or only ingest them in an insufficient quantity because true bugs only suck up the interior plant tissue. In biologically cultivated crops there are currently no suitable pest control agents available at all, since no beneficial organisms and no plant protection agents for controlling true bugs are available that are also not harmful to beneficial organisms or specific. Due to unsatisfactory pest control options, especially in organic farming, a true bug infestation is currently associated with significant economic damage.

Combining pest control agents with attractants for the pests is already known. For example, German patent application DE 10 2005 056 795 A1 describes a plant protection agent for controlling the chestnut leaf miner, wherein behavior-modifying substances having a repellent, deterrent, and/or inhibiting effect are used in combination with, for example, pheromones. German patent application DE 195 28 529 A1 describes a pest control agent having at least one signal substance and possibly having pesticide active substances, wherein a UV absorber is also provided in order to prevent rapid decomposition of the agent, caused by environmental conditions, following application of the substance. With these agents their effectiveness in controlling true bugs is still problematic, since a relatively large quantity of the insecticide or pest control agent in general must still be ingested by these robust insects before the desired effect is attained. Therefore such agents, even in combination with an attractant for the insects, have not yet attained the desired effectiveness in controlling true bugs.

Microcapsules that imitate a food substrate, especially for green lacewings, or for mesostigmata, are known from European patent EP 2 415 356 B1. These are matrix capsules that are overall infused with a matrix structures so that the insects or mites must eat the entire capsules or must suck them with very high suction power in order to reach the contents.

The underlying object of the invention is to provide an effective preparation for pest control. This object is attained using the liquid-core capsules described in claim 1. Preferred embodiments of the liquid-core capsules, a method for producing the liquid-core capsules, use in pest control, and a carrier for controlled release of active substance (attractant release) are the subject matters of the other claims.

The present invention provides a novel preparation for pest control that is based on liquid-core capsules having a separate core and shell structure (core shell capsules). The liquid-core capsules according to the invention comprise an aqueous core that comprises at least one pest control agent. The term "aqueous core" means that the core comprises a liquid phase that is disposed in the hollow interior of the capsule. In addition, the liquid-core capsules according to the invention have a diffusion-inhibiting, functional outer shell that comprises at least one attractant for the pests. The diffusion-inhibiting outer shell is distinguished by a low water content so that in principle the exterior of the liquid-core capsule is dry and in particular may be provided in the form of a pourable granulate. The water content of the outer shell is preferably <1%, especially <0.5%. It is particularly preferred that the water content of the outer shell is nearly zero. This may be realized in particular using waxes and or fats for the outer shell. Moreover, the content of the aqueous core is protected from evaporation by the diffusion-inhibiting outer shell, so that the liquid-core capsules may be applied to crops and they will not dry out over an extended period of time and their effect can develop.

One important aspect of the liquid-core capsules according to the invention is the release of the attractants from the outer shell. A base substance that is based on fats and/or waxes, preferably paraffin, is preferably used for manufacturing the outer shell. In one particularly preferred embodiment, the outer shell comprises the base structure based on fats and/or waxes and, in addition, an oil, in particular a vegetable oil. Rapeseed oil or sunflower oil is suitable, for example. In principle other oils may also be used, for example synthetic oils. It is also possible for the base substance to be only partly made of fats and/or waxes. In particular the combination of the base substance with an oil may attain a metered and long-term release of the attractants from the outer shell, which release is particularly advantageous for the pest controlling action of the liquid-core capsules.

In general, fatty acids or wax-like substances that are able to form films for the required functionalities (barrier, strength, viscosity) are suitable for the base substance. In one particularly preferred embodiment, the base substance of the outer shell is made, at least in part, and preferably entirely, of paraffin, preferably soft paraffin. Soft paraffin especially has proved particularly suitable, since, firstly, it provides very reliable protection against evaporation, and, secondly, it is particularly easy for the insects that are to be attracted to pierce with their mouthparts.

The proportion of the oil in the outer shell is preferably in a range between 1 and 25% (w/w). The percentage proportion of the attractant may be, for example, in a range between 0.0001 and 1%. The inventors believe that the particular effect of this combination of basic substance, in particular paraffin, oil, and attractant in the outer shell derives from the fact that oil mixed into the base substance separates very slowly and relatively continuously on the surface (sweating). The reason for this effect is presumably the different density, which leads to the separation of the non-polar substances. The density of the paraffin at room temperature is approximately 0.81-0.89 $g/cm^3$, the density of, for example, rapeseed oil is somewhat higher and is 0.9 to 0.92 $g/cm^3$. The speed of the separation increases with the difference in density and may thus be regulated by selecting appropriate combinations. Another control mechanism results from the quantity of oil used. The absolute release quantity of the attractant per unit of time drops with the quantity of oil mixed into the base substance, as has been demonstrated in experiments. The oil thus acts as an inhibitor of attractant release.

The use of vegetable oil in the outer shell has the further effect that the vegetable oil may act as a piercing stimulant for the pests to be controlled. A piercing stimulant is a semiochemical that indicates, or at least suggests, a potential source of nutrition to the animal (the pest). The piercing stimulant leads primarily to the piercing behavior of the pest being triggered or intensified. For example, oils of cruciferous plants, e.g. rapeseed oil, or substances derived therefrom, act as a piercing stimulant for certain pests, so rapeseed oil is particular preferred. Other piercing stimulants besides a vegetable oil may also be used, or it is possible for a plurality of piercing stimulants to be used for the liquid-core capsules.

The oil leaking from the outer shell intensifies the triggering of piercing behavior and food intake (phagostimulation), especially in true bugs, and has the additional effect of simultaneously slowing the transport of the attractant to the capsule surface, where the attractant is released into the air (evaporation). Oil that is rubbed or washed off of the capsule (e.g. during mechanical processing or rain) is replaced from the layer of the outer shell relatively continuously.

The individual components of the outer shell thus have the following functions:

Base substance, e.g. paraffin: Protection from diffusion, oxidation, and UV for core solution, depot for attractant and oil Oil, e.g. vegetable oil: piercing stimulant and phagostimulant, regulator for release of attractants Attractants, especially volatile attractants: attracts pests The outer shell thus permits, as particular functions, continuous and long-term release of volatile attractants for attracting pests and continuous and long-term release of the oil that acts in pests as an attractive nutritional component or as a stimulant for piercing and ingestion of nutrition.

In general, in the field of plant protection measures for pest control, periods of about 1 week are considered acceptable reaction times. Such a period for attractant release may be attained with the liquid-core capsules according to the invention with nothing further. However, much longer periods for attractant release, and of course for the stability of the liquid-core capsules, are possible using different possible adjustments. For example, increasing the layer thickness of the outer shell can extend the release of attractant. In general, the outer shell may be formed from, for example, approximately 15 to 30% material, that is, in particular base substance plus oil, relative to the weight of the capsule. Using a relatively high proportion, e.g. 30%, can retard release of the attractant over an extended period of time.

It is particularly preferred that the outer shell has an outer region that is free of attractant. This outer region may be formed, for example, essentially from the base substance or from the base substance plus oil. Using this measure attains an additional opportunity for adjusting the speed or duration of attractant release, wherein further retardation of the release of active substance is attained using this additional outer region. In addition, in this embodiment the required quantity of the generally expensive attractant may be reduced using this optimization of the release rate, while retaining the same effectiveness of the capsules. Since, in addition to its inhibitory function for the attractant release, the oil in the outer shell also acts as a piercing stimulant, it may be advantageous to do without the oil in the outer additional region of the outer shell in order to also attain a retarded release for the oil, the retarded release for the oil being adjusted to the release of the attractant. Thus oil and attractant are released in parallel, which may be particularly advantageous if both substances interact with one another in their effect on the pests. The outer shell may be constructed, for example, such that different regions transition smoothly into one another with different attractant concentrations. The attractant concentration in the outer shell may in particular decrease from inside to outside.

The contents of the core preferably further comprise at least one phagostimulant that prompts and stimulates the pests to ingest the contents of the core. In general, phagostimulants are substances that animate animals to eat. Carbohydrates and/or amino acids and/or fats may in particular be used as phagostimulants. Particularly suitable is a nutritional composition for the pests that contains such substances, wherein to this end for example a standard nutritional solution for true bugs or other insects may be used. Sweeteners, for instance e.g. *Stevia* and/or erythritol, are also suitable as phagostimulants.

The aqueous core of the liquid-core capsules is preferably enclosed by a hydrogel shell. This has special advantages, especially with respect to the production of the liquid-core capsules. The hydrogel shell primarily stabilizes the aqueous core of the capsules during a preferred manufacturing process for the liquid-core capsules. During this manufacturing process, first primary capsules that comprise the liquid core covered by the hydrogel shell are produced. Then these primary capsules are coated with the material for the outer shell. However, other manufacturing processes in which the hydrogel shell is not absolutely necessary are also possible. The aforesaid manufacturing process with the primary capsules has proved to be particularly advantageous and suitable, however, as will be explained in greater detail below.

The liquid-core capsules permit, in a particularly advantageous manner, pest control and in particular also control of very robust pests, such as, for example, plant-damaging true bugs that are very difficult to control, or can only be controlled in an unsatisfactory manner, with conventional pest control agents. The functional outer shell of the liquid-core capsules according to the invention may preferably be pierced by biting-sucking and/or piercing-sucking mouthparts of the pests to be controlled. The liquid-core capsules according to the invention are therefore in particular suitable for controlling plant-damaging pests that have such biting-sucking and/or piercing-sucking mouthparts.

The core of the liquid-core capsules according to the invention preferably has an aqueous solution or a water-based emulsion. The consistency of the contents of the liquid-core capsules is thus adapted to the natural food of the pests so that the pests can ingest the contents of the liquid-core capsules with their mouthparts. The liquid-core capsules according to the invention imitate the food substrate for the pests in a certain way, that is, for instance, they imitate a fruit or another plant part. The pests are attracted by the attractant or attractants that is/are contained in or on the outer shell of the liquid-core capsules, and are stimulated to consider the liquid-core capsules to be a food source and to pierce or bite into the liquid-core capsules and ingest at least parts of the contents of the liquid-core capsules with the pest control agent contained therein. Whether the content of the core is formed from an aqueous solution or a water-based emulsion depends primarily on which specific pest control agent is used and whether this specific pest control agent dissolves in water or in an aqueous buffer or may be provided more simply as an emulsion. What is important is that the aqueous phase that is the contents of the core may be sucked by the mouthparts of the pests.

The liquid-core capsules according to the invention are based on the so-called attract-and-kill principle and lure the pests. By sucking in the core contents from the liquid-core capsules, the pests are effectively controlled by the pest control agent contained in the core, wherein the effect of the pest control agent depends on the pest control agent employed. For instance, the pests may be immobilized, injured, or killed, so that damage to crops caused by the pests, or some other type of damage, is prevented or at least significantly reduced.

In principle, the liquid-core capsules according to the invention are suitable for controlling all pests that have biting-sucking or piercing-sucking mouthparts, especially true bugs and, for instance, also lice, *thrips*, and cicadas. In particular the liquid-core capsules according to the invention are suitable for controlling plant pests in agricultural and horticultural undertakings.

The liquid-core capsules according to the invention are suitable for use with different pest control agents. For example, the liquid-core capsules are suitable for the use of conventional chemical pest control agents (chemical active substances) that, in combination with the liquid-core capsules, may be used as edible poisons. Examples of chemical edible poisons that may be used according to the invention are lambda-cyhalothrin (active ingredient in e.g. KARATE® ZEON), spinosad (active ingredient in e.g. CONSERVE™), and thiacloprid (active ingredient in e.g. CALYPSO®).

Biological and natural pest control agents may be used with particular advantage as active substances, especially against pests that damage plants. Due to the structure of the liquid-core capsules according to the invention, pest control agents that have not been previously used or have only been used with unsatisfactory results may be successfully employed using these capsules in this form. In one particularly preferred embodiment of the liquid-core capsules according to the invention, the pest control agent is at least one biological active substance. It is particularly advantageous that biological active substances that have already been tested and approved may be used. Biological active substances of entomopathogenic bacteria and/or entomopathogenic viruses and/or neem tree active substances and/or at least one derivative of these substances are particularly suitable, for example. The active substances of entomopathogenic bacteria are preferably so-called Bt isolates (Bt=*Bacillus thuringiensis*), which are already known for controlling pests that eat plants. The Bt toxins lead to the decomposition of the intestinal wall. The pest does not die immediately, but stops food intake very rapidly so that the plant-damaging action is terminated. Viral entomopathogenic active substances are in particular granulose viruses that damage the digestive tract and, for instance in certain caterpillars, lead to death within one to two days. Specific Bt and granulose virus preparations for pest control are currently not available because they cannot be ingested by the true bugs with the conventional spray treatment. However, these active substances may be used effectively in conjunction with the liquid-core capsules according to the invention. Moreover, neem tree preparations are particularly preferred. They are already known for pest control and may be used with particular advantage for the liquid-core capsules according to the invention. Neem tree preparations, in combination with the liquid-core capsules according to the invention, have proved particularly effective. Preferably neem tree oil preparations are used that contain azadirachtin, which acts an insecticide and which is particularly well suited for biological pest control. An effect on true bugs following a spray treatment with azadirachtin has already been demonstrated in the laboratory and in field studies (e.g. DARA, p. (2013): *Biological and Microbial Control Options for Managing Lygus Bug in Strawberries. Lygus Bug IPM Seminar, UCCE, Watsonville,* 18 Apr. 2013. http://cesantabarbara.ucanr.edu/files/165601.pdf). The active substance azadirachtin has a number of effects on true bug organisms, e.g. food ingestion, development, movement, and reproduction are inhibited. Combining the active substance azadirachtin with the liquid-core capsules according to the invention may significantly reduce damage caused by true bugs.

The hydrogel shell that may be provided with the liquid-core capsules according to the invention is preferably formed from a biopolymer composition. The biopolymers alginate and/or pectin are used in particular. Other additives, especially shellac and/or waxes, may be added with special advantage. These additives have the advantage that the hydrogel shell may be embodied significantly thinner and more stably, in particular compared to a shell that is constructed for instance only from alginate and/or pectin. At the same time, the stability and properties of the hydrogel shell are improved with respect to water diffusion. In particular, water diffusion is limited such that the liquid core does not lose any water, or loses significantly less water, due to evaporation during the coating process for manufacture of the functional outer shell. In one particularly preferred embodiment of the liquid-core capsules, microcrystalline cellulose (MCC) is used as an additive for the hydrogel shell. Adding MCC, for instance in a concentration range between approximately 0.1 to 0.5%, especially 0.3%, in the biopolymer composition, results in a hydrogel shell that is thinner and simultaneously more stable than other hydrogel shells.

From a process perspective, the core, with the aqueous phase contained therein, and the hydrogel shell enclosing this core form the so-called primary capsule, which is coated with the functional outer shell. On the one hand, this outer shell has the function of being pierceable for the mouthparts of the pests to be controlled. In addition, the outer shell has the function of attracting the pests, in that at least one attractant is integrated into the outer shell (functional outer shell). In addition, it is important that the outer shell is diffusion-inhibiting, so that the outer shell can provide the required stability for the liquid-core capsules and protection from damaging environmental influences, such as especially protection from dryness and UV radiation.

The outer shell is preferably manufactured such that an appropriate mixture for the functional outer shell is sprayed onto the primary capsule, wherein the primary capsules are preferably spray coated in a fluidized bed. Moreover, it is possible for the base substance and a separate mixture that contains the attractant or attractants to be applied to the primary capsule in a dual layer. In the context of the above description, this dual layer shall be construed to be the outer shell with a plurality of or two regions. This dual layer, wherein the outer layer (outer region) is preferably formed from the base substance alone or in combination with the oil, has the aforesaid advantage of a further delayed attractant release. This double spray coating of the primary capsules may also be produced in one process without interrupting the fluidized bed. For this it is merely necessary to switch the suction of the spray solution from one container, in which the substances for the inner layer are disposed, to a different container, in which the substances for the outer region are disposed. Alternatively, the functional outer shell may also be produced, without the intermediate step of manufacturing a primary capsule, in the manner described in greater detail below.

The use of coating substances based on fats and/or waxes furthermore has the advantage that this can sharply limit water loss in the core solution due to evaporation. Moreover, these substances have the advantage that they are largely impenetrable for damaging UV radiation and therefore provide protection against decomposition of the core content substances due to the environment.

The attractant is advantageously a volatile attractant that is given off into the immediate vicinity by the outer shell. This attractant thus develops a certain long-range effect so that pests that stop in the vicinity are attracted. The attractant is preferably a substance separated naturally from plants or a substance derived therefrom, in particular a substance with a hydrocarbon framework, for instance volatile aldehydes, alcohols, esters, or terpenes. These are in particular volatile organic compounds (VOC) that are naturally separated from plants and satisfy many functions in nature. Such substances are found, for example, on the surface of plant parts (cuticular substances) or are given off by the plants via their stoma or glands. Moreover, volatile chemical compounds may be used as attractants. Particularly preferred are substances that are natural components of the so-called "green leaf volatiles" (GLV) that plants release when they are mechanically injured. One effect of these substances is that they attract the pests. According to the invention, such attractants or a substance derived therefrom that has the same effect on the pests is used for the liquid-core capsules according to the invention. Synthetic substances (derivatives), for example, that act like the natural attractants and/or have the same effect on the pests as the natural attractants may be used as attractants. One particularly preferred base composition for the attractant contains hexenol (e.g. 46.7%), (Z)-3-hexenyl acetate (e.g. 32.5%), (Z)-3-hexenal (e.g. 5.7%), (E,E)-α-farnesene (e.g. 4%), β-bourbonen isomer (+) (e.g. 3.9%), (Z)-3-(Z)-3-hexenylbutanoate (e.g. 3.6%), β-caryophyllene isomer (−) (e.g. 0.8%), and (E)-4,8-dimethyl-1,3,7-nonatriene (e.g. 0.1%). It is already know that such compounds come out of wounded leaf material more concentrated and attract insects (PARÉ, P. W & TUMLINSON J. H. (1999): *Plant Volatiles as a Defense against Insect herbivores. Plant Physiology, October* 1999, Vol. 121, pp. 325-331; FRATI F. et al (2008): *Role of the plant—conspecific complex in host location and intra-specific communication of Lygus rugulipennis. Physiol. Entomol.* (2008) 33, 129-137). The base substances of the attractant may be supplemented in many ways and their ratio to one another may be altered in order to modify the effect and adjust to the pest that is to be controlled. Typical blossom odors, such as for instance phenylacetaldehyde and (E)-cinnamaldehyde, may also be used for successfully attracting the pests.

The use of volatile attractants is particularly advantageous, since as a rule the pests to be controlled register attractants on their antennae using specific chemoreceptors and then move in a directed manner (chemotaxis). This natural behavior of the animals is used in that suitable attractants, in particular in concentrated form, are added to the outer shell of the liquid-core capsules. In this context, primarily the substances contained in general plant odors (green leaf volatiles) are suitable as the attractant for plant pests, in particular for true bugs (*Lygus* spp.). The attractant (s) is/are preferably selected and used in a concentration such that the attractant and thus the liquid-core capsule according to the invention is more attractive to the pest than the plant.

The liquid-core capsules according to the invention are distinguished by a dry, diffusion-inhibiting outer shell. They may therefore be provided as a dry and pourable granulate that is simple to handle when applying the liquid-core capsules to crops, for instance.

Substances that may be added to the environment without cause for concern are used in a particularly advantageous manner for the functional outer shell and where necessary for the hydrogel shell. Substances that are already used in the food industry are particularly suitable. Fats, waxes, and shellac, for instance, are particularly suitable for the liquid-core capsules for this reason.

The outer shell of the inventive liquid core capsules preferably has a mean thickness in a range between 50 and 500 μm, in particular between 100 and 300 μm. The layer thickness of the hydrogel shell is on average preferably between 50 to 350 μm, in particular between 80 and 150 μm. Tests have demonstrated that with such a structure of the liquid-core capsules, the pests can pierce the shell of the capsules with nothing further in order to be able to get to the contents of the liquid-core capsules.

The mean diameter of the liquid-core capsules is preferably in a range between 1 and 10 mm, in particular between 2 and 6 mm. This size for the microcapsules has proved particularly advantageous, since this size can be easily managed by the true bugs or even by other pests so that the individual capsules may be fixed and pierced by the pests. Moreover, a size in this range for the liquid-core capsules is also very favorable because at this size the liquid-core capsules may be applied to crops using conventional methods, using a seed spreader.

The spherical shape of the liquid-core capsules according to the invention offers a large surface on which the attractant or attractants can leak. The active substances, that is, the pest control agent or agents, are protected by the functional outer shell from damaging environmental influences, especially from drying out, UV damage, and potential oxidation. Moreover, the liquid-core capsules according to the invention may be applied densely and over large surface areas using existing methods and devices, for instance using a seed spreader or fertilizer mixer. They are also suitable for use outside of the soil and may in principle be used for a number of types of pests, wherein the substances should be adjusted appropriately to the specific organisms.

The liquid-core capsules according to the invention have the special advantage that the active substances do not come into direct contact with the crop because they are in the capsule. The risk that residues will travel into the food chain is therefore significantly reduced. Moreover, in general it is not necessary to maintain waiting times between the time of treatment and harvesting, so that crops can be protected with no gaps in coverage. Compared to conventional pest control agents, the liquid-core capsules according to the invention and the active substances contained therein are used significantly more sparingly, since the pests are lured by the liquid-core capsules according to the invention to move to the liquid-core capsules and thus to the pest control agent. The crops therefore do not need to be treated with blanket-coverage. Moreover, the effect of the liquid-core capsules according to the invention on specific target organisms, that is, on the specific pests to be controlled, is limited by the specific attractants. Because of this highly specific pest control method, the pest control agents formulated according to the invention are not hazardous to bees and their effect is sustainable, since the populations of beneficial organisms present are protected. In addition, the liquid-core capsules according to the invention may also be used in combination with pest control agents that did not demonstrate any effect in previous applications. The reason for this is in particular that edible poisons can be applied that, when applied in a conventional manner, only build up on the surface of the plant and therefore are not ingested by sucking pests. In addition, pest control agents that are very sensitive to UV radiation (e.g. special Bt toxins and granulose viruses) or that have a generally rapid decomposition rate may be used, since they are protected from decomposition by the formulation in the form of the liquid-core capsules according to the invention. In addition, the liquid-core capsules according to the invention are also suitable for the formulation of pest control agents that contain relatively large active substance molecules, which, as such, cannot be transported into the plant. For example, the liquid-core capsules according to the invention may also be used for biological or biotechnological pest control agents such as mushroom spoors, viruses, nematodes, enzymes, or adhesives. The liquid core capsules according to the invention thus provide an environmentally-friendly option that spares resources to use active substances in a targeted and sparing manner, wherein the crop does not come into direct contact with the active substance. In addition, the liquid-core capsules according to the invention have a favorable ecotoxicological profile.

The invention furthermore comprises a method for producing liquid-core capsules. This method first comprises providing a mixture for the aqueous core of the liquid-core capsules. The mixture contains at least one pest control agent, and, possibly, at least one phagostimulant for the pests. This mixtures is preferably an aqueous solution or a water-based emulsion. Moreover, a mixture or, possibly, a plurality of mixtures, are prepared for the diffusion-inhibiting functional outer shell. This/these mixture(s) preferably contain(s) a base substance for the functional outer shell, preferably in combination with an oil, and at least one attractant for pests. It is also possible for two or more mixtures to be prepared for the outer shell, wherein one mixture contains the base substance(s) and another mixture contains the at least one attractant. The liquid-core capsules according to the invention are manufactured using these mixtures.

In one particularly preferred embodiment of the manufacturing method, the aqueous core of the capsules is first stabilized in the form of a primary capsule, wherein the aqueous core is enclosed with a hydrogel shell. Provided for this is a hydrocolloid solution that is provided for forming the hydrogel shell. The hydrocolloid solution is based in particular on a biopolymer composition. Alginates and/or pectin are particularly preferred as the biopolymers. Furthermore, it is advantageous to provide additives in order to influence the stability and water diffusion properties of the hydrogel shell. In particular shellac and/or wax may be used, wherein this makes it possible to embody the shell such that it is significantly thinner and more stable than without additives. Microcrystalline cellulose is particularly suitable as an additive. Primary capsules that contain as the core a liquid phase that is enclosed by a hydrogel shell are manufactured using the mixture for the aqueous core and the hydrocolloid solution. The primary capsules are then coated with one or a plurality of layers with the mixture(s) for the outer shell, wherein the primary capsules are spray coated, preferably undried or only superficially dried in a fluidized bed.

The embodiment of the hydrogel shell for manufacturing the primary capsules is based on cross-linking the biopolymers, especially cross-linking alginate. The cross-linking is in particular achieved in that, for instance, a solution with sodium alginate is brought into contact with bivalent calcium ions ($Ca^{2+}$). The calcium displaces the sodium, the alginate molecules being suddenly cross-linked. A gel forms that comprises calcium alginate. The gel has a spongy structure that comprises up to about 99% water or an aqueous liquid. This spongy structure is also called hydrogel. The inner shell of the liquid core capsules preferably comprises such a hydrogel, wherein the core itself remains liquid and is free of the hydrogel structure. The shell formation in the method according to the invention occurs from inside to outside, so that the core as such remains liquid. Thus, compared to the manufacture of a matrix capsule known, for example, from EP 2 415 356 B1, this is reverse spherization.

Due to the embodiment of the hydrogel shell, the liquid phase of the core is converted to a manageable spherical shape (primary capsule) that permits subsequent coating for embodying the functional outer shell. In addition to the pest control agent, and possibly a phagostimulant, e.g. a nutrient solution that stimulates the pests to ingest the active substance, the aqueous core contains additional substances that in certain circumstances are advantageous for the manufacturing process. The additives usefully do not have a negative effect on the pest control agent.

Two different methods in particular are especially advantageous for manufacturing the primary capsules. In a first, particularly preferred method, the mixture for the core is added to the hydrocolloid by droplet, wherein bivalent ions, for example $Ca^{2+}$, has been added to the mixture for the core in advance. The sudden cross-linking occurs as soon as a droplet penetrates into the hydrocolloid solution, so that the hydrogel structure forms as the primary shell. The embodiment of the hydrogel is limited to the shell and the core remains liquid. In an alternative method, the primary capsule may be produced using coextrusion, wherein the mixture for the core and the hydrocolloid solution are added by droplet to a precipitation bath using a special nozzle. The special nozzle for coextrusion is a so-called two-material nozzle that produces liquid droplets that contain inside the mixture for the core and outside a cover with the hydrocolloid solution. The precipitation bath and usefully also the mixture for the core contain bivalent ions, for example $Ca^{2+}$ in the form of $CaCl_2$, so that in this method, as well, cross-linking occurs in the hydrocolloid solution and causes a hydrogel shell to form around the liquid core. According to the embodiment of the hydrogel shell, the primary capsules are rinsed and dripped off.

The primary capsules manufactured in this manner have a wet surface due to the high water content in the hydrogel shell. In the next step, these wet capsules are provided with the diffusion-inhibiting, functional outer shell, wherein spray coating in a fluidized bed is preferably performed for this. The spray coating occurs in the fluidized bed, for instance in a so-called fluidized bed spray coater. The primary capsules are introduced into a coating chamber, wherein air is blown in so that the primary capsules float, to a certain extent, in the air stream. The coating material, that is, the mixture or mixtures for the functional outer shell, are sprayed in until the desired coating of the primary capsules is attained. The original water content of the core mixture is essentially retained.

In principle the coating material may be applied in two forms during coating. Either a hot melt or a solution may be employed, depending the materials used. Water or organic substances are suitable for solvents. A hot melt is suitable in particular for applying fats or waxes. A coating with a solution is suitable if the coating substances can be dissolved in a suitable solvent. For applying the functional outer shell, preferably about 15 to 30% material is applied relative to the weight of the capsules. The layer thickness of the functional outer shell is preferably between 50 and 500 µm, in particular between 100 and 300 µm. With a hot melt, in general the coating may precipitate in a somewhat greater thickness than with a coating using an aqueous solution. The mixture for the outer shell is preferably based on a base substance, in particular paraffin, and an oil component, preferably at a percental portion in the mixture of 1 to 25%. Moreover, the attractant or attractants is/are contained in the mixture, for instance at a portion of 0.0001 to 1%. In addition to the function of attracting the pests due to the controlled release of appropriate attractants, the functional outer shell primarily also has the function of protecting against evaporation. The outer shell therefore preferably tightly closes off the primary capsules to the outside. In this context, the use of waxes and/or fats for the outer shell is particularly advantageous, since this attains very effective protection from evaporation.

When adjusting the specific process conditions, in particular for the spray coating, the adhesion, permeability, and mechanical properties of the coating substances are usefully taken into account in that factors such as, for instance, spray rate, spray pressure, process air quantity, process air temperatures, and spray temperature are appropriately adjusted.

Since the different substances for the individual capsule components (core, hydrogel shell, outer shell) influence the function and manufacturing process, the manufacturing conditions are usefully adapted to and adjusted for the specific substances used. It is possible to prevent negative chemical interactions in this way.

It is referred to the description above regarding other features of the manufacturing process for the liquid-core capsules, for instance the attractants to be used and the pest control agents to be used that are added during the course of the manufacturing process.

One particular advantage of the liquid-core capsules according to the invention and the manufacturing method according to the invention is that the liquid-core capsules are suitable for large-scale production and in particular for industrial production. Thus a preparation for pest control, for instance for controlling very robust true bugs (*Lygus* spp.), may be provided, with which preparation economic damage due to pests may be prevented or at least significantly reduced in vegetable production. Preparations based on the liquid-core capsules according to the invention may be applied to large surface areas with available technology, since the liquid-core capsules according to the invention are relatively robust.

The invention furthermore comprises liquid-core capsules that may be manufactured using the described manufacturing method and in particular using the preferred embodiments of the manufacturing method. In particular the invention comprises liquid-core capsules that may be manufactured by adding by droplet a mixture for an aqueous core of the liquid-core capsules to a mixture for forming a hydrogel shell of the liquid-core capsules or by co-extruding a mixture for the aqueous core and a mixture for a hydrogel shell of the liquid-core capsules in a precipitation bath for embodying the primary capsules and subsequently spray coating the primary capsules in a fluidized bed. The coating or the functional outer shell is responsible for releasing the attractant, protecting the core liquid, and stabilizing the hydrogel capsules.

The invention furthermore comprises a preparation for pest control or a use of the liquid-core capsules according to the invention in a preparation for pest control, wherein the preparation comprises the described liquid-core capsules. The liquid-core capsules may be provided in the form of pourable granulate that is applied to crops. The liquid-core capsules or the granulate may be spread, for instance, using a conventional seed spreader. Moreover, the preparation may be provided in the form of portions packed in small bags, wherein the bags may be added to crops. Moreover, the preparation may be provided, for example, in the form of small cards, or the like, to which the liquid-core capsules according to the invention are adhered or affixed in some manner. The invention also comprises a method for pest control, wherein the preparation for pest control is provided with the liquid-core capsules according to the invention and applied to crops.

Independent of the described liquid-core capsules that are set up for pest control, the invention furthermore comprises a carrier for controlled or adjustable release of at least one active substance. The carrier has a layer that is formed by a base substance based on fats and/or waxes, in particular paraffin (e.g. soft paraffin). Moreover, preferably oil is provided as an additional component in the layer, in particular a vegetable oil. The at least one active substance is added into or integrated into this layer. The term "active substance" here means, inter alia, an attractant according to the description above, that is, a substance that attracts insect or other pests. In addition, "active substance" may also refer to a repellent that has a repelling effect on insects or other pests. Thus this may refer in general to odors that may be registered by animals and that in general trigger a behavioral reaction. Moreover, this may also refer to other substances that may be used independently of pest control, e.g. pharmaceutically or cosmetically active substances or something else. The inventive carrier may also be used, for example, for an air freshener with suitable odors (active substances) that are pleasant to humans.

The portion of the oil in the layer is preferably in a range between 1 to 25%. In addition, it may be preferred that the layer has an outer region that faces away from the carrier and is free of active substance. Combining a base substance with a specific portion of oil permits a delayed (retarded) release of active substance to be attained, as was demonstrated in experiments by the inventors. By adjusting or varying the components of the layer it is possible to modify the specific release rate and adapt it to different requirements. In particular increasing the oil portion can further delay the release of the active substance. The release of the active substance may also be retarded by increasing the layer thickness. Moreover, the release of active substance may be retarded and thus the period of active substance release may be extended by applying another outer layer that is free of active substance, or by applying another outer region having a reduced active substance concentration or having no active substance. It is referred to the description above for additional background and advantageous embodiments of this aspect of the invention, wherein the outer shell of the liquid-core capsules described above shall be understood as a layer of the claimed carrier. The carrier itself may be in the form of a particulate carrier, for instance in the form of plastic or polymer or Styrofoam beads or other spherical or particulate material. Particulate carriers have the advantage that the particles provide condensation nuclei for a coating with the layer, for instance in a fluidized bed method. In addition, the particle shape may be advantageous for later use of the carrier. For example, such a spreadable carrier having appropriate active substances may also be used in plant protection. However, other carrier shapes are also possible, for example plate-shaped or cardlet-shaped carriers that may likewise be preferred, depending on the application. The carriers according to the invention that have the active substance or substances to be released may in principle be used in all fields that need a targeted and especially retarded release of active substances, preferably over a prolonged period of time, for example over days or weeks. The special advantage of the inventive carrier is that the rate of release may be intentionally adjusted to the specific application by appropriately selecting the components of the layer and their ratio to one another.

Additional features and advantages of the invention result from the description of exemplary embodiments in the following in conjunction with the drawings. The individual features may be realized alone or in combination with one another.

Figure 2:
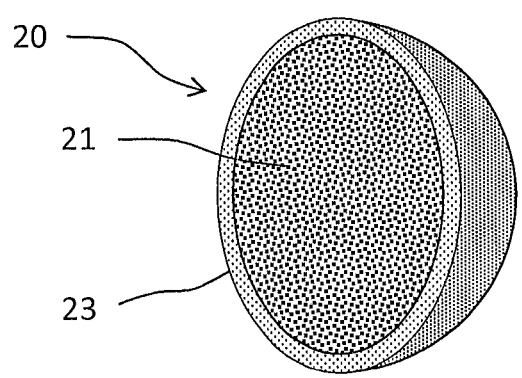
Figure 3:
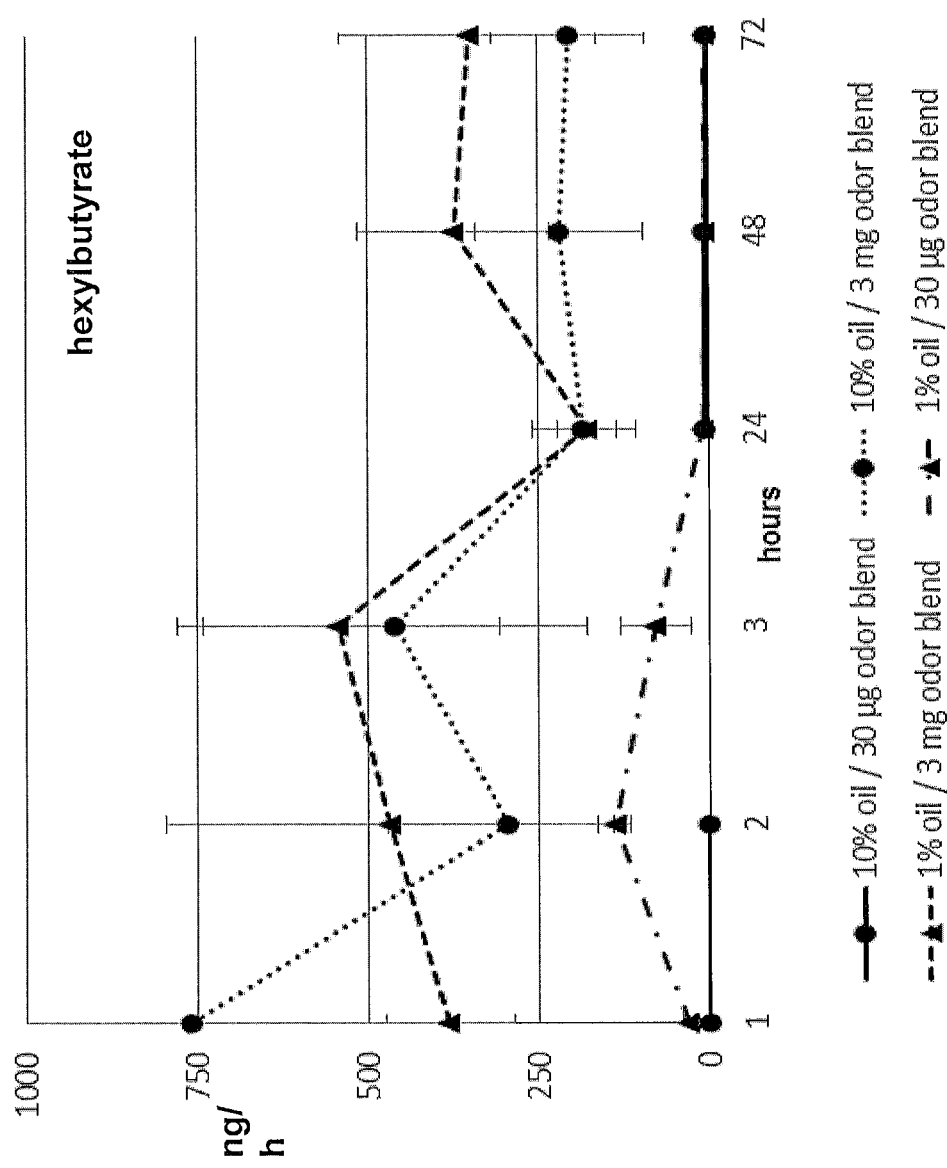
Figure 4:
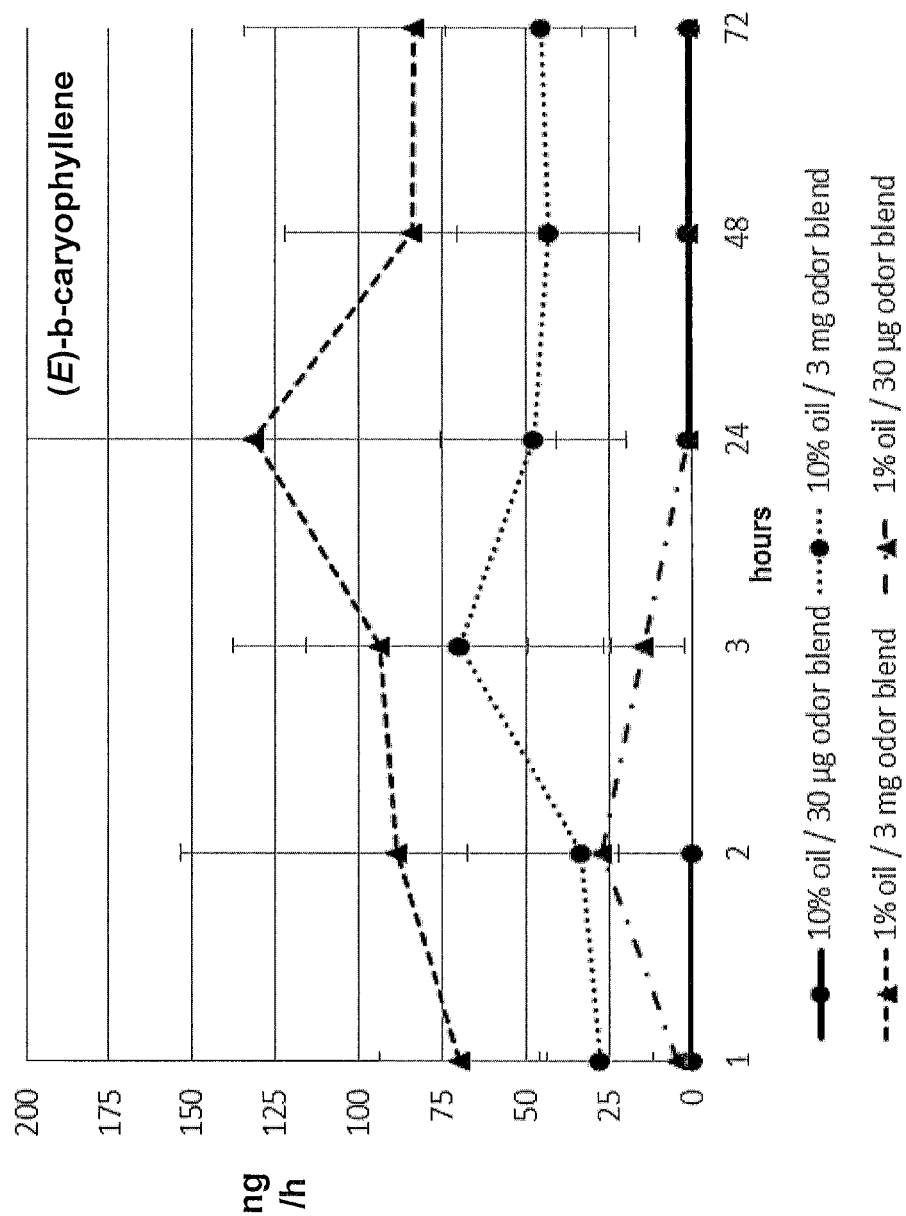
Figure 5:
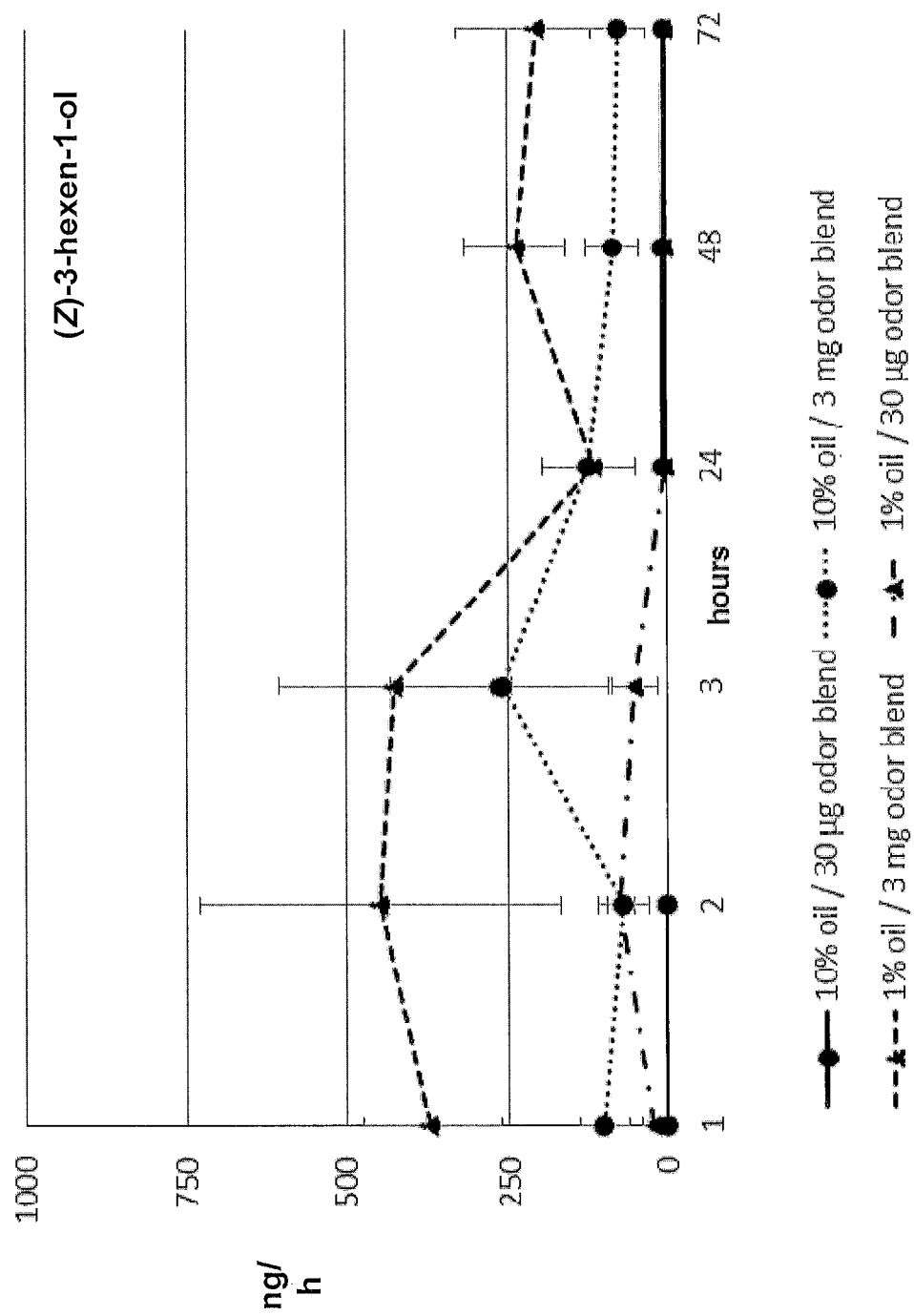
Figure 6:
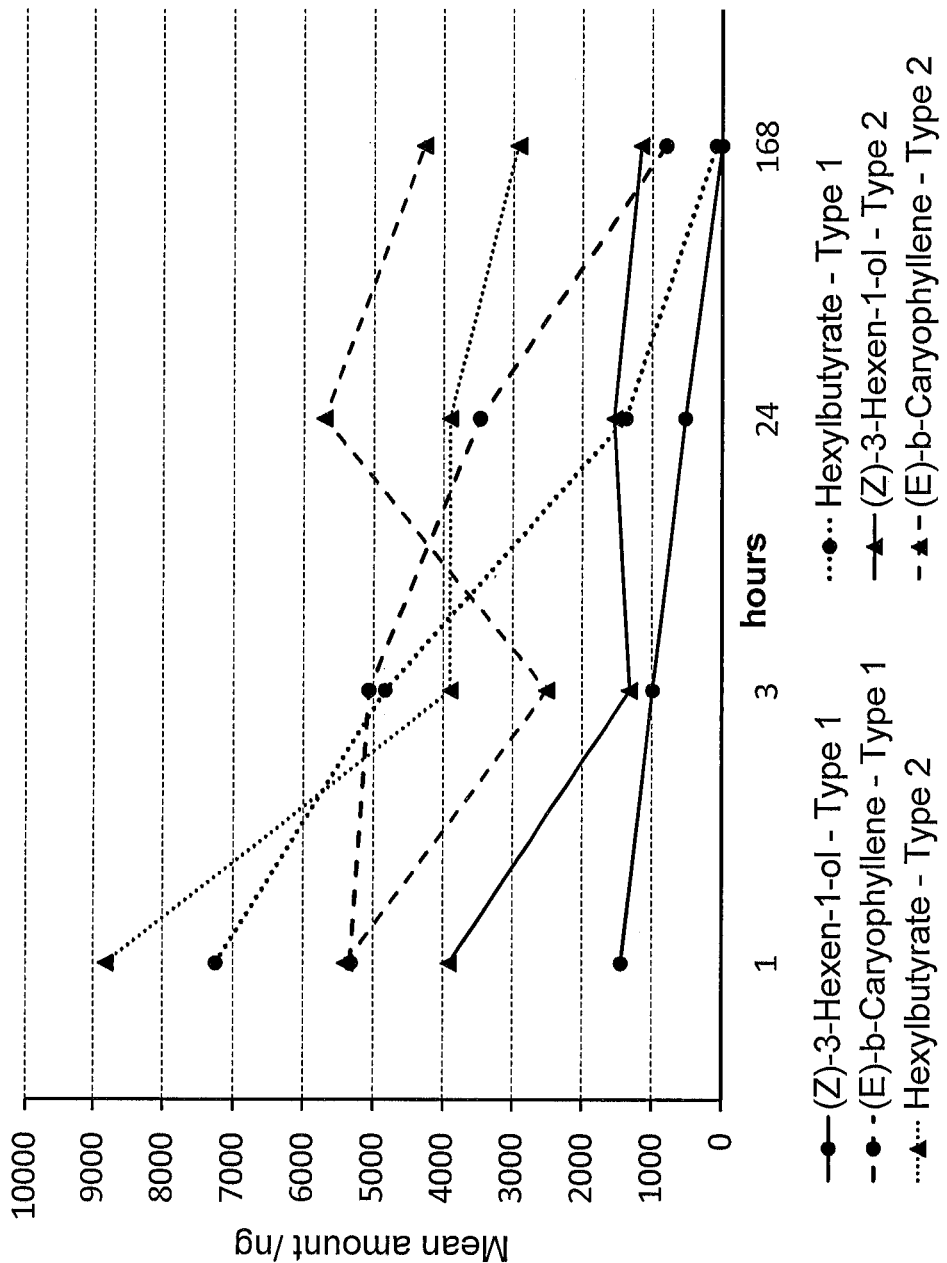
Figure 7:
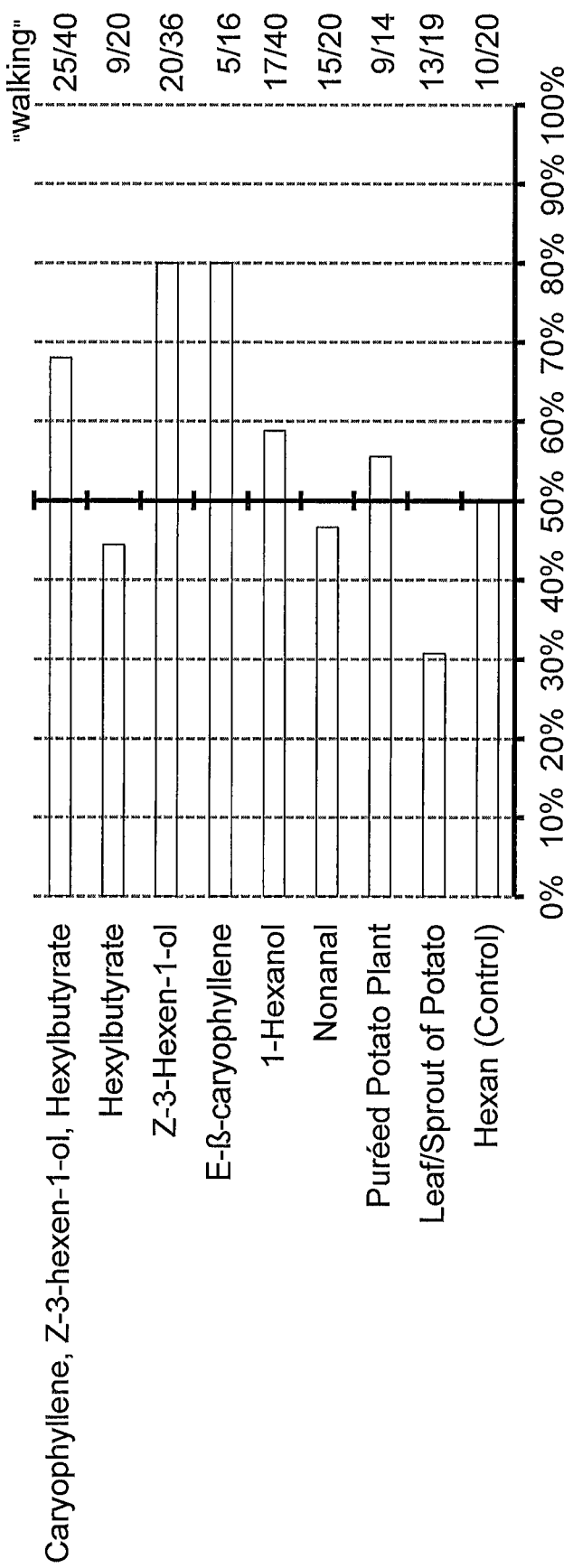
Figure 8:
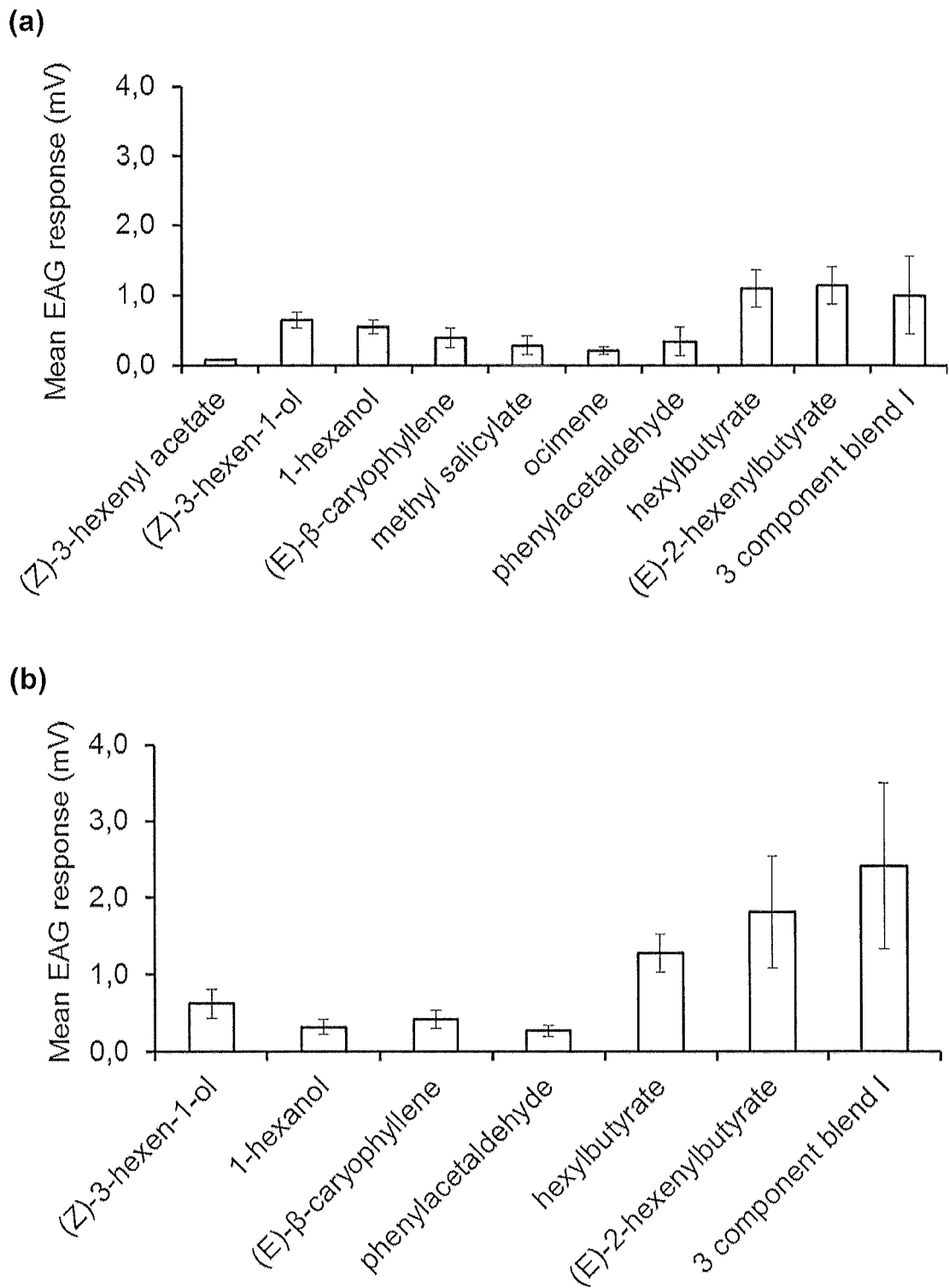
Figure 9:
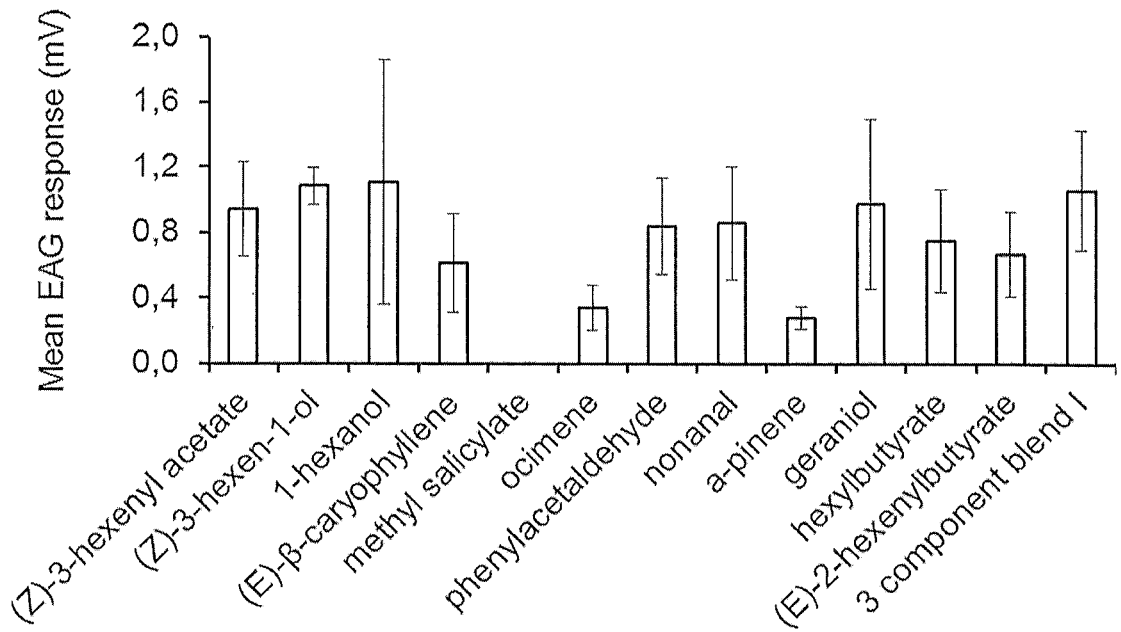
Figure 9:
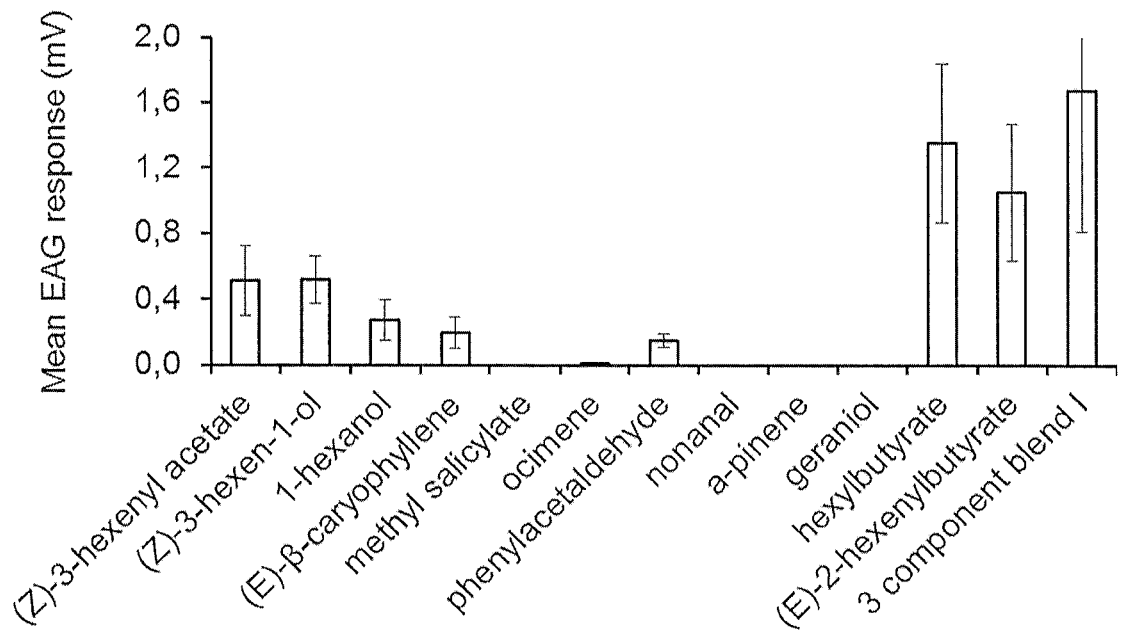

In the drawings it is shown:

FIGS. 1 and 2 schematic depictions of the structure of liquid-core capsules according to the invention, with and without hydrogel shell;

FIGS. 3 to 5 release of active substances ((Z)-3-hexen-1-ol in FIG. 3, hexyl butyrate in FIG. 4, (E)-β-caryophyllene in FIG. 5) in a model system having different oil contents in the layer containing the active substance;

FIG. 6 temporal course of the active substance release in different types of liquid-core capsules;

FIG. 7 olfactometer results with different active substances (attractants) in terms of their ability to attract true bugs (0.01 μg/μL); and, FIGS. 8 and 9 effect of different active substances on true bugs using electrophysiological examinations (0.1 μg active substance in FIG. 8, 10 μg active substance in FIG. 9).

DESCRIPTION OF EXEMPLARY EMBODIMENTS

The liquid-core capsule 10 depicted in FIG. 1 is formed by a core 11 that comprises a liquid phase. The aqueous core 11 contains the pest control agent or, possibly, a plurality of pest control agents, and preferably a phagostimulant, in particular a food composition for the pests to be controlled. This core 11 is enclosed by a hydrogel shell 12. The hydrogel shell 12 is preferably formed by biopolymers, in particular alginate and/or pectin, that due to cross-linking form a shell around the aqueous core 11. The aqueous core 11, together with the hydrogel shell 12, form the so-called primary capsule. This primary capsule is enclosed by a functional outer shell 13. The outer shell 13 contains the attractant or attractants and possibly one or a plurality of piercing stimulants for the pests. The outer shell 13 is embodied such that it may be pierced by the mouthparts of the pests to be controlled, in particular by biting-sucking and/or piercing-sucking mouthparts. Due to the attractant or attractants integrated in the outer shell 13, the pests are attracted and prompted to pierce the outer shell 13 with their mouthparts and to ingest at least some of the aqueous content of the core 11. This causes injury to, immobilization of, and/or death of the pests, depending on the action of the pest control agent contained in the core 11.

For manufacture of the liquid-core capsules 10 according to the invention, first a primary capsule is manufactured in which the aqueous core 11 is enclosed by a hydrogel shell 12. Then the wet primary capsules are coated in a fluidized bed in order to form the dry, functional outer shell 13.

Due to the addition of additives for the hydrogel shell 12, water diffusion through the shell of the primary capsule is reduced. This may significantly reduce the adhesion forces between the primary capsules so that they may be moved (fluidized) separated from one another in an air flow for spray coating and the water content in the core mixture essentially remains just as high. This is very advantageous for spray coating in a fluidized bed.

The hydrocolloid solution for the hydrogel shell 12 is manufactured based on sodium alginate, for instance. For this, for instance approximately 0.5 to 2% alginate (w/v) may be dissolved in distilled water by stirring for a prolonged period. Shellac may be used as an additive, wherein for example a 25% aqueous shellac solution is added to the alginate solution (e.g. 20 parts shellac solution+80 parts alginate solution).

Preliminary experiments have demonstrated that the losses in mass from the core may be effectively reduced by adding additives to the hydrogel shell. The following table summarizes the absolute losses in mass for alginate model cylinders (d=13 mm, h=13 mm) after 240 minutes, with the addition of various additives in their most suitable concentrations and the relative losses in mass compared to the losses in mass of the standard specimen without the additives (MCC—microcrystalline cellulose, EC—ethyl cellulose).

| Additive | Added concentration [%] | Loss in mass [%] after 240 min without additive ("Standard") | Loss in mass [%] after 240 min with additive ("Specimen") | Specimen loss in mass after 240 min compared to Standard loss in mass [%] |
|---|---|---|---|---|
| Shellac | 15.0 | 6.59 | 5.46 | −17.12 |
| Chitosan | 0.75 | 5.22 | 4.52 | −13.45 |
| Stearic acid | 0.90 | 7.43 | 6.92 | −6.87 |
| Bee's wax | 0.90 | 5.22 | 4.72 | −9.51 |
| MCC | 0.30 | 6.56 | 6.03 | −8.15 |
| EC | 0.75 | 5.83 | 5.34 | −8.34 |

This demonstrates that the loss in mass may be reduced by approximately 17%, for instance by the addition of shellac.

The possibly provided hydrogel shell preferably forms approximately 10 to 15% of the diameter of the primary capsule, so that sufficient space is provided for the liquid phase of the core. In one exemplary mean total diameter of the liquid-core capsules of about 4 mm, the thickness of the hydrogel shell may than be, for example, approximately 250 μm. This provides sufficient strength for the primary capsules, which withstand the forces of the spray coating in the fluidized bed. Selecting suitable hydrogels and adapting the substance concentrations and the process parameters attains a water diffusion rate that is as low as possible in the primary capsules so that optimum coating may take place in the fluidized bed. The reduction in water diffusion by the hydrogel shell is attained in particular using the added additives.

The primary capsules may be manufactured by means of a special nozzle that is used for adding the mixture for the aqueous core to the hydrocolloid solution by droplet. Adding the mixture for the core by droplet to the hydrocolloid solution is accomplished while stirring. The temperature, pressure, mixing ratios, pH, stirring speed, viscosity, pump power, and process times may be adjusted and optimized depending on the materials used. Bivalent ions, such a for instance calcium lactate or calcium chloride, may be added in advance to the mixture for the core. Alternatively, magnesium chloride may be used, for example. The primary capsules embodied during this process contain an aqueous core and an enclosing hydrogel shell made of cross-linked biopolymer (alginate). During manufacture, the alginate shell deposits to a certain extent on the droplets of the mixture for the core. After one or a plurality of rinse steps, the primary capsules are dried off and spray-coated in a fluidized bed coater for manufacturing the functional outer shell in the fluidized bed. The attractant or attractants is/are integrated into the outer shell while this is done. The strength of the outer shell should therefore be created such that it may be pierced, for instance, by true bugs. On the other hand, the outer shell is stable enough that it can withstand the mechanical stresses during output of the liquid-core capsules according to the invention and moreover protects the contents of the liquid-core capsules from harmful environmental aspects, e.g. drying out and UV radiation. The liquid-core capsules according to the invention may thus develop their effect over an extended period of time in that the attractants are output into the environment over an extended period of time and thus attract the pests. The pest control agent in the interior of the liquid-core capsules is also protected and stable over an extended period of time and its effect may thus develop.

FIG. 2 also illustrates a liquid core capsule 20 according the invention having a liquid core 21 and a diffusion-inhibiting functional outer shell 23. In this embodiment, no hydrogel shell is provided, since the manufacturing process for this liquid core capsule does not use the intermediate step of stabilizing the liquid core in the form of a primary capsule. For example, the so-called Inducap®-CORE technology may be used in principle for such a manufacturing method, in which method the liquid starting mixtures for the core and the functional outer shell are portioned into individual liquid volumes via a concentric two-material nozzle by means of hydraulic pulses and are added to a consolidation area so that a liquid droplet of the core liquid is enclosed by the consolidated shell liquid. A temperature chamber, the temperature of which is less than the melting point of the material of the outer shell is suitable for the consolidation area, for example.

The functional outer shell 13, 23 of the liquid-core capsules is essentially dry and diffusion-inhibiting so that the liquid-core capsules 10, 20 according to the invention are pourable, in principle, and thus is simple to manage during use. The outer shell 13, 23 ensures protection against evaporation so that the liquid-core capsules 10, 20 may be applied to crops and their effect may develop there for a prolonged period of time.

The liquid-core capsules according to the invention may be used in combination with various pest control agents, in particular with biological and natural pest control agents that protect against plant-damaging true bugs. By selecting appropriate pest control agents and selecting suitable attractants, the liquid-core capsules according to the invention may be adapted to the specific type of pest to be controlled, wherein the manufacturing method for the liquid-core capsules is usefully adapted to the specific substances.

The pest control agent should kill off the pest as rapidly as possible, or at least weaken it such that no more damage is caused by the pest. Of the group of biological active substances, especially Bt isolates and active substances of the neem tree are suitable for controlling true bugs. Both substances have a broad spectrum of action, demonstrate rapid effect, and are also permitted for organic farming. In a suitable pest control agent for a pest to be controlled, following direct ingestion of the active substance by the pest, the damage rate to the pest (mortality and/or cessation of food ingestion) should preferably reach greater than 70%, wherein the effect should begin after a few hours. Neem tree active substances, especially, in combination with the liquid-core capsules have proven particularly effective in controlling the true bugs.

The decision rate of the pests in an olfactometer trial may be used for evaluating the attractiveness of the attractants used according to the invention compared to a plant (host plant for the pests). The decision rate should preferably be clearly greater than 50% for the attractant used. For identifying suitable attractants in adaptation to a pest to be controlled, in a first step natural odors may be concentrated, for example by extraction with a suitable solvent. The active components of the concentrated odors may then be identified more precisely and their effect may be increased, for instance, as concentrated synthetic substances. Different sources of odor may be investigated for identifying suitable attractants. For instance, complete plants, plant parts, extracts, saps, or solutions may be used and investigated in olfactometer tests so that effective substances may be identified. The effective substances may furthermore be analyzed by gas chromatograph and further investigated. The attractants identified may preferably be integrated into the outer shell, in concentrated and essentially pure form, with or without additives, to further increase the luring effect of the liquid-core capsules.

The attractants are identified and obtained by steps, for instance:
Selection of suitable attractant sources, for example, known host plants for the pests or preferably fruits;
Obtaining plant odors (odor mixtures) by producing extracts;
Checking suitability in olfactometer tests;
Electroantennography (see below) in combination with separation by gas chromatography for identifying the active components in the odor mixtures;
Manufacture of a mixture of a synthetic or partly synthetic attractant based on the active substance(s) determined.

Suitable for attractants are in particular non-polar volatile substances that are mixed with waxes and/or fats and may be applied in a common layer as a functional outer layer of the liquid-core capsules. If polar substances are used as attractants, they are preferably applied in the form of an extra layer so that there is no increase in the evaporation of water from the aqueous core.

Green leaf volatiles (GLV) and/or volatile organic compounds (VOC) are especially suitable for attractants. As a rule GLV may be derived from the C6 body (Z)-3-hexenal. VOC are in particular lipophilic substances that can be categorized into the following classes: terpenoids, derivatives of fatty acid metabolism, phenylpropane (incl. benzene derivatives), compounds containing nitrogen, and compounds containing sulfur. It is particularly preferred that (Z)-3-hexenyl acetate and/or (Z)-3-hexen-1-ol and/or (E)-β-caryophyllene and/or 1-hexanol and/or nonanal and/or hexyl butyrate and/or (E)-2-hexenyl butyrate and/or mixtures thereof are used as attractants. Homogenized (puréed) potato plants may also be used as attractants, for instance. A mixture of caryophyllene, (Z)-3-hexen-1-ol and hexyl butyrate is particularly preferred. The particularly advantageous effect of these substances in terms of attracting true bugs was demonstrated by the inventors.

The composition of the liquid-core capsules according to the invention is preferably adjusted such that attractant is released over a period of 14 days or more, wherein the liquid-core capsules have a greater attracting action on the pests than the plants that are to be protected.

The strength of the outer shell is preferably adjusted such that it is soft enough that the pests can pierce it. At the same time, the strength of the outer shell is adjusted such that it demonstrates adequate stability for machine application. The strength of the outer shell may be modified, for instance, by the use of waxes having different melting points or by the use of different long-chain fatty acids. Brittle or hard outer shells may be softened, for instance by adding in glycerin. The composition of the functional outer shell is usefully further adjusted such that there is adequate permeability for the attractant or attractants.

The following description of exemplary embodiments illustrates particularly preferred options for manufacturing the liquid-core capsules.

A. Method for Manufacturing Liquid-Core Capsules

Two methods that essentially differ from one another in the type of nozzle used and the associated technical functionalities (regulation, yield, process safety) were used for manufacturing the inventive liquid core capsules. A differentiation should be made between manufacturing liquid-core capsules with a hydrogel shell and manufacturing liquid-core capsules without a hydrogel shell. The hydrogel shell is a kind of auxiliary structure that stabilizes the liquid capsule core during the manufacturing process and forms the primary capsule. Its function develops as soon as the outer shell is applied in a second method step. The primary capsule occurs as an intermediate product and may be manufactured by means of special single-material or two-material nozzles (coextrusion nozzles). Liquid-core capsules without a hydrogel shell are manufactured using special two-material nozzles. Shape, stabilization, and coating are combined in one process during the manufacture of liquid-core capsules having no hydrogel shell. As a result, the core is enclosed directly by the outer shell.

A.1 Liquid-Core Capsules Having a Hydrogel Shell

6% (w/w) calcium lactate, relative to the water content of the nutrient solution, is added to a conventional nutrient mixture for insects. A suitable nutrient mixture comprises, for instance: 68% dist. water, 5% dry yeast, 6% yeast extract, 10% powdered egg yolks, 5% sugar, 5% honey, and 1% casein, with a total water content of 73%.

Then the plant protection agent NeemAzal®-T/S is added to the mixture at a ratio of approximately 1:200. These compounds form the core solution of the liquid-core capsules to be manufactured.

A 0.1% sodium alginate solution is prepared as a cross-linkable hydrocolloid solution. An additive is also added to the hydrocolloid solution in order to improve, in the manner desired, the shell properties of the primary capsule to be produced. A 20% aqueous shellac solution that is mixed with the hydrocolloid solution at a ratio of 1:6 is used as an additive in one batch. In another batch, 0.9% (w/w) bee's wax is used in the hydrocolloid solution. For the mixture with the bee's wax, it is useful to produce a hot melt of approximately 80° C. and to disperse it in the hydrocolloid solution at about 20,000 to 25,000 rpm for at least 3 minutes. In another batch, 0.3% MCC is dispersed in the sodium alginate solution.

A.1.1 Manufacturing the Primary Capsules by Means of Droplet Formation

The core solution is added to the hydrocolloid solution by droplet by means of a nozzle while stirring. The primary capsule form, and after a few minutes are separated by screening from the hydrocolloid solution and rinsed with water. The nozzle comprises a channel from which the core solution exits by droplet. The channel is concentrically surrounded by a second channel through which air flows. The size of the droplets may be regulated, and the breakaway from the outlet opening may be significantly accelerated, using the air quantity set (separating air). The central channel has an inner diameter between 0.5 to 1.5 mm, the surrounding channel has a diameter between 1.5 and 3 mm.

This basic structure is relatively simple technically and may be reproduced as desired, for the most part, in order to increase production performance. Thus, e.g., 128 dual channels may be combined in one nozzle head. The core solution is delivered from a supply container using a pump or pressure build-up. The supply quantity is preferably between 0.5 to 2 g per minute and nozzle channel.

Alternatively, the primary capsules may also be manufactured by means of a two-material nozzle in which two streams of liquid may be conveyed at the same time (coextrusion). It is also possible to manufacture relatively small (0.5 to 1 mm) and especially uniform primary capsules with coextrusion nozzles. Compared to single-material nozzle, these nozzles have reduced output, require greater technical regulation, and are not as easy to combine to create larger units. In addition to the single-material nozzle described in the foregoing, the coextrusion nozzle has another channel. The nutrient solution is conveyed in the inner channel, the hydrocolloid solution in the surrounding channel. At the outlet opening, a covering made of the hydrocolloid solution deposits around the spherical core droplet and the cross-linking reaction (formation of the hydrogel shell) begins immediately, from inside to outside. As already described in the foregoing for the single-material nozzle, the break-away from the outlet opening may be accelerated by an additional separation air channel. Two-material nozzles that do not convey material continuously, but instead convey the core solution through the exiting hydrocolloid solution by means of a pulse, may also be used. The droplet formation and ejection may occur as with the technology of an ink-jet printer. The result is the same in each case: upon passing through a second liquid, the core liquid droplets are enclosed by this second liquid. Finally, the primary capsules already forming in free-fall are added by droplet to a bath of cross-linking solution, which contains, for example 1% calcium chloride or 6% calcium lactate, in order to completely form and stabilize the hydrogel shell. The primary capsules are then separated from the cross-linking solution (e.g. separation by screening method) and rinsed with water.

A.1.2 Manufacture of the Functional Outer Shell

The coating mixture for the outer shell essentially comprises three components: a wax-like base substance, for example soft paraffin, rapeseed oil as a piercing stimulant and as a regulator for release of the active substance, and an attractant. The attractant used comprises a composition of the most widely used components of green leaf volatiles (GLV) and volatile organic compounds (VOC) from plants. A suitable mixture of the attractant may include, for example, hexenol, (Z)-3-hexenyl acetate, (Z)-3-hexenal, (E,E)-α-farnesene, β-bourbonen isomer (+), (Z)-3-(Z)-3-hexenylbutanoat, β-caryophyllene isomer (−), and/or (E)-4,8-dimethyl-1,3,7-nonatriene. Pure forms of these substances may be obtained from chemical companies (e.g. SigmaAldrich Co. LLC) and may be mixed precisely as needed. Moreover, odor mixtures obtained from leaves (e.g., cucumber, alfalfa, horse chestnuts, tobacco) by means of special extraction methods (e.g. headspace sampling or solid phase microextraction (SPME)) may be used. One particularly preferred attractant mixture is manufactured from (Z)-3-hexene-1-ol, hexyl butyrate and (E)-b-caryophyllene in a 1:1:1 ratio. The base substance (approximately 90%), the piercing stimulant (approximately 9.8%) and the attractant (approximately 0.2%) are mixed. First a preliminary mixture of attractant and piercing stimulant is manufactured, and this mixture is then stirred into the base substance melt. The temperature of the melt is at least 10 to 30° C. above the melting point of the base substance. A dispersion device (approximately 20,000 rpm) is used to obtain a very uniform and fine distribution of the preliminary mixture.

Following manufacture of the primary capsules and preparation of the coating mixture, the outer shell is applied to the primary capsules using a spray coating system (coating process). Approximately 300 to 400 g of primary capsules created by droplets may be coated in a production container that holds about 1 Liter. The production quantity may be increased significantly depending on the production system. The required fluidization of the primary capsules is attained at a process air quantity between 50 and 70 $m^3$/h. Immediately following fluidization, the coating mixture, in the form of a melt, is sprayed into the production container. The required functionalities may be attained with the following parameters: temperature of the melt 30 to 50° C. above the melting point of the base substance, spray rate between 4 and 7 g/min. The coating process is terminated when approximately 15% to 35% (relative to the capsule weight), especially 15% to 30%, and preferably 20% to 30%, of the coating mixture has been applied to the primary capsules. With this method of manufacture, the desired properties for the liquid-core capsules may be precisely and reproducibly adjusted, especially with respect to the layer thickness of the outer shell and the sharpness of the boundary surface formation.

Due to the lower viscosity of the piercing stimulant (rapeseed oil) and the attractant mixed therein compared to the base substance, these substances slowly leak from the base substance of the outer shell so that they can exert their long-range effect on the pests. The speed of this release process increases with the temperature. Preliminary tests have indicated that, for example, approximately 15% of the rapeseed oil has left a wax block weighing 100 g and originally containing 10% rapeseed oil within 10 days at 25° C. This effect leads to continuous release of piercing stimulant and attractant and provides the required action at a distance and long-term effect of the liquid-core capsules.

A.2 Liquid-Core Capsules without Hydrogel Shell

Coextrusion nozzles (two-material nozzles) that have an inner channel for the core solution and a concentric, surrounding channel for a melt of the coating mixture are used for the manufacture of liquid-core capsules without a hydrogel shell. When the core liquid droplet passes through, it is enclosed by the coating mixture. The temperature of the core liquid is approximately 10° C. below the melting point of the coating mixture, so that the melt hardens very rapidly from inside to outside and stabilizes the droplets. The capsules are added by droplet to a cooled water bath (approximately 10 to 20° C.) while stirring in order to finish the hardening.

B. Controlling the European Tarnished Plant Bug *Lygus* Rugulipennis

The bug *Lygus rugulipennis* is very common throughout Europe and attacks about 400 types of host plants from more than 50 families of plants. Economic damages are suffered, e.g. for strawberries, cucumbers, potatoes, cabbage, alfalfa, carrots, tobacco, and various ornamental plants like, for instance, chrysanthemums and fuchsia (HOLOPAINEN, J. K. & VARIS, A.-L. 1991*: Host Plants of the European tarnished plant bug Lygus rugulipennis. J. Appl. Ent.* 111 (1991). 484-498; DRAGLAND, S. 1991: *Lygus rugulipennis, a harmful insect to many cultivated plants—II. Damage in cabbage fields and control measures. Håret entege. II. Skadar i kålfelt.* 67-76; *BECH, R.* 1967*: Zur Bedeutung der Lygus-Arten als Pflanzenschädlinge. Biol. Zentrbl. Heft* 2. 205-232).

Experiments were conducted with *Lygus rugulipennis* and the liquid-core capsules according to the invention, wherein an aqueous nutrient solution having 0.5% NeemAzal® T/S (biological active substance: azadirachtin 0.1%) was present in the core of the capsules. Another experiment was conducted with the chemical active substance acetamiprid (0.01%). When they had contact with the liquid-core capsules, the true bugs used their proboscis to pierce the outer shells of the liquid-core capsules and ingest at least some of the core solution. This was evidenced, inter alia, in petri dishes (d=35 mm), to each of which one fully developed bug (imago) or an older nymph (L4/L5) was added, together with the liquid core capsules, and the behavior of the true bugs was observed for a period of 5 min. The animals were subjected to a 6-hour hunger phase prior to the beginning of the experiment. All of the animals whose proboscis had contact with the outer shell of the liquid-core capsules according to the invention also pierced said outer shell and ingested the core liquid. The lengthy dwell time of the proboscis in the capsule permits this conclusion. With the imago insects, this was an average of 160 seconds, 150 seconds with the nymphs. With the imago insects, this was preceded by a mean testing period (feeling the capsule with the proboscis) of about 30 seconds. With the nymphs, on the other hand, the proboscis was used for piercing almost immediately after initial contact. 28% of all of the animals observed did not test the capsules during the observation period, but rather experienced lengthy resting phases or simply passed over the capsule.

The true bugs ceased their activity nearly entirely about 1 day after ingesting the core liquid with the active substance azadirachtin and died after 5 days, on average. The chemical active substance acetamiprid took effect a few seconds after being ingested. The animals were observed quivering violently, death occurred a few minutes later.

C. Applying the Liquid-Core Capsules to Crops

Using olfactometer selection experiments it was determined that a suitable mean capsule interval in the cultivated area to be treated is approximately 5 cm, so that approximately 400 capsules/m$^2$ was calculated for application to the crops. Given a mean capsule weight of 15.1 mg, the required quantity is approximately 61 kg/ha. The option of applying the liquid-core capsules according to the invention over a large surface area was tested by means of a pneumatic seeding machine, type PS 250 from APV-Technische Produkte GmbH. With this machine it was possible to distribute the required 61 kg uniformly on 1 ha in approximately 30 min, at a mean travel velocity of 3 km/h and a spread of 7 m. The amount thrown off per unit of time is regulated using the seed shaft speed. In the aforesaid example, the set value required was 75%. A comparison of mechanically unstressed liquid-core capsules according to the invention to stressed liquid-core capsules that were ejected through the seeding machine yielded a damage rate of less than 2%. Loss of mass due to evaporation was used as a measure for damage. The outer shell thus had adequate strength to withstand application by machine.

In addition to uniform distribution, the capsules may also be applied pointwise to the crops to be protected. Small carrier cards made of stiff cardboard (approx. 30×80 mm in size) to which the liquid-core capsules are adhered are suitable for this. The cards are preferably equipped with a suitable hook to permit simple and rapid attachment to each plant. This application format is suitable especially for protected crops, e.g. crops in a greenhouse or polytunnel. The crop areas therein are frequently not accessible for large machines and individual plants are not distributed uniformly, but rather are disposed on special tables, so that surface application is difficult.

D. Model System for Release of Attractants as a Function of the Composition of the Outer Shell Odor Mixture (Active Substances)

3 components in a 1:1:1 ratio

Green leaf volatiles and sexual pheromone

Volatility among the individual components varies

Variants

Model system for shell mixture in petri dishes, layer thickness approximately 0.5 mm

- Shell mixture 1 composition: 1.2 g paraffin, 10% vegetable oil, 30 μg odor mixture
- Shell mixture 2 composition: 1.2 g paraffin, 1% vegetable oil, 30 μg odor mixture
- Shell mixture 3 composition: 1.2 g paraffin, 10% vegetable oil, 3 mg odor mixture
- Shell mixture 4 composition 4: 1.2 g paraffin, 1% vegetable oil, 3 mg odor mixture Implementation For manufacturing the model system, a paraffin melt was prepared at 80° C. 1% or 10% vegetable oil was stirred into the melt. Then the three odors (mixtures) were added in two different quantities (30 μg and 3 mg per 1.2 g mixture) by means of microliter injection. The mixture was poured into petri dishes at a layer thickness of approximately 0.5 to 1 mm.

Directly following manufacture of the specimens, the odor was collected by means of special apparatus (head-space sampling). The collection filter was removed after an appropriate period of time and frozen until analysis. The odors underwent chemical analysis by means of gas chromatography with mass spectrometry coupling=GC-MS.

Results

In the model system it was demonstrated that the odors are given off relatively constantly (linearly) over a time period of 72 h. The experiment was terminated after 72 h. Only a fraction of the odor contained in the model system was given off during this period. If it is assumed that the linear release will remain somewhat constant, it would be approx. 100 days before all of the odor would be used up.

FIGS. 3, 4 and 5 graphically illustrate the quantity of odor released over the course of time (up to 72 h) for each odor individually. A nearly linear release per hour is evident. The total quantity in ng/h of the odor mixture (all three components) is e.g. 1% oil and 3 mg total quantity of odor mixture at (250+325+80=655) 655 ng/h. I.e., at a constant release, the capsules would release odor for up to 190 days (3000 μg/0.655 μg=191 days).

Furthermore, it may be seen that compared to batches with 1% oil, in batches with 10% oil a smaller odor release was evident nearly continuously. This indicates that the oil quantity influences the release of the odor. Increasing the oil content leads to reduced release. This effect was evident in the concentrations of the two odors. As a result, therefore, the attractant release may be reduced or delayed by increasing the oil portion.

E. Comparison of Active Substance Release in Liquid-Core Capsules in Two Manufacturing Variants Liquid-Core Capsules

- Manufacturing variant, type 1: first spray phase (inner wall region) 10% paraffin (relative to capsule weight), second spray phase (outer wall region) 10% shell mixture 4 (see Section D)
- Manufacturing variant type 2: first spray phase (inner wall region) 15% shell mixture 4, second spray phase (outer wall region) 15% paraffin The liquid-core capsules were manufactured as described in Section A. The experiment was conducted in principle as in the model system described in Section D in terms of odor collection and analysis using gas chromatography with mass spectrometry coupling. The following table and FIG. 6 summarize the results of the experiment.

| Total quantity of odor per unit of time | | |
|---|---|---|
| | 1 week Type 1 | 1 week Type 2 |
| (Z)-3-hexen-1-ol | 15.2 | 235.1 |
| Hexyl butyrate | 58.8 | 592.0 |
| (E)-b-caryophyllene | 205.2 | 781.0 |
| Total quantity of odor/µg | 279.2 | 1608.2 |
| (Z)-3-hexen-1-ol | 0.5 | 7.8 |
| Hexyl butyrate | 2.0 | 19.7 |
| (E)-b-caryophyllene | 6.8 | 26.0 |
| Odor collected/% | 9.3 | 53.6 |

Elevated release was observed for the liquid-core capsules of manufacturing variant Type 1. Nearly all of the odors had escaped after only 1 week, since the at this point in time the capsules hardly gave off any more odor. On the other hand, it was only possible to collect 9.3% of the added odors. The difference may be explained as loss during the manufacturing process that is unavoidable due to the high volatility of the attractants.

A reduced release was attained with the liquid-core capsules from the manufacturing variant Type 2. After a release that was initially somewhat higher in the first hour, the rate remained quite constant over the measured period of 1 week. The absolute odor release was approx. 50%. Significant quantities of odor were still given off after 1 week. Thus the odor supply at this point in time had still not been exhausted and it was possible to avoid a very high loss of odor during manufacture. FIG. 6 illustrates the temporal course of the release of the active substance in both types of capsules, each separately for the individual odors. The figure illustrates each quantity released per hour, these being calculated from the quantities collected at collection times 1 h, 3 h, 24 h, and 168 h. Given the trend of the release curve in FIG. 6, there is a release period of at least 2 weeks with this variant.

It is clear from comparing the two manufacturing variants that in principle this period of time could be extended significantly, e.g. by applying 20% pure paraffin as a final layer and 10% shell mixture, or even using a layer of 25% paraffin on the outside and 5% on the inside.

The results demonstrate that the escape of the odor may be delayed or accelerated, depending on the capsule manufacturing variant. Type 1, in which the odor mixture is sprayed on as the last layer, exhibits increased release of the odor. In contrast, for Type 2 the odor mixture is then enclosed by a layer of pure paraffin. In addition, the layer thicknesses are increased from 10% by weight application to 15% by weight application. Process management thus has a direct effect on capsule structure and the release of the odor.

SUMMARY

It may be seen that the time span for the odor release and the released odor concentration/per unit of time may be modified very easily. This may be done using different combinations of odor concentration, vegetable oil, and paraffin. Adapting the method when spraying on the shell mixture can also attain targeted modification of odor release. Thus there are very good options for adapting the system to different requirements for pest control (type of pest, type of plant, cultivation system). The odor concentrations required for attracting the pests may be adjusted and released over an extended period of time, wherein a reaction time period of about 1 week is generally considered acceptable for plant protection measures.

F. Olfactometer Experiments for Investigating the Attractant Effect on True Bugs Comparative behavior studies were conducted on the bug species *Lygus rugulipennis* in the olfactometer for identifying suitable attractants (odors). The attracting action of a total of 28 different concentrations of substances and substance mixtures was determined in about 380 individual tests. A result was considered purely coincidental if 50% of the animals decided in favor of an odor and 50% decided against. The odor is considered attractive if more than about 65% of the animals move towards it. Because of the nature of the experiment, a decision rate of nearly 100% is not to be expected, because elements of other behavior patterns in which odors do not play any role (e.g. escape, stress) are also always a factor. The certainty of the evaluation increases with the number of tests and is accepted after about 10 repetitions. FIG. 7 presents a selection of the results, wherein an attractant concentration of 0.01 µg/µL was used for the tests from which these results derive.

Hexane, the solvent used, has no effect on the directional decision. A precisely coincidental distribution of 50% of the controls also demonstrated that there was no preference for one side or the other in the olfactometer.

Some of the pure attractants demonstrated very strong attracting action. For instance, 80% of the true bugs ran in the direction of the attractant when offered (Z)-3-hexen-1-ol or (E)-β-caryophyllene. The sexual attractant hexyl butyrate, which is described as attractive in the literature, was not preferred in olfactometer experiments. Attraction was also attained with a three-component mixture. In addition, it was found that the concentrations of the individual attractants influenced the outcome. For example, it was found that an increase in the concentration can change the attracting action. Thus, e.g. the effect of (Z)-3-hexen-1-ol and β-caryophyllene is reduced in increased concentrations, while that of nonanal increases, wherein nonanal at a concentration of 0.01 µg/µL had an attracting action of about 45%, and at a concentration of 1 µg/µL had an attracting action of about 60%.

The attractant concentrations that may be released with the liquid-core capsules according to the invention are in the range of perception for true bugs, as the olfactometer tests conducted confirm. Consequently, the true bugs register the odor mixture used at least in the investigated concentration range from 10 ng to 10 µg. A very good attracting action was found at a concentration of 100 ng. This required release range may be attained with nothing further with the functional outer shell of the liquid-core capsules according to the invention.

G Electrophysiological Examinations of True Bugs

Electroantennography is a method for measuring the olfactory reactions of an insect by recording electrical signals on the antennae, wherein slow changes in receptor potential that are preferably recorded in the extracellular space within the insect antenna are analyzed. Complex odor mixtures may be investigated using this method. For instance, the use of electroantennography for identifying attractants for wasps is known from DE 11 2010 005 095 T5.

FIGS. 8 and 9 summarize the results of electrophysiological examinations of true bugs. Green leaf volatiles (Z)-3-hexenyl acetate, (Z)-3-hexen-1-ol, 1-hexenal, the terpenoids (E)-β-caryophyllene, methyl salicylate, ocimene, phenylacetaldehyde, nonanal, alpha-pinene, and geraniol were tested as plant odors, hexyl butyrate and (E)-2-hexenyl butyrate were tested as pheromones of insects, and a synthetic active substance mixture made of (Z)-3-hexen-1-ol, (E)-β-caryophyllene, and hexyl butyrate were tested. FIG. 8 provides the responses in female (a) and male (b) true bugs at an active substance concentration of 0.1 µg/µL. FIG. 9 provides the responses in female (a) and male (b) true bugs at an active substance concentration of 10 µg/µL.

The results show that the true bugs have chemoreceptors on their antennae and they are quite able to register the group of pheromones and GLVs with these chemoreceptors. Of the group of eating-induced plant odors, only nonanal and phenylacetaldehyde were registered in the higher concentration, wherein nonanal was essentially registered by the females. The strength of the antenna stimulation in the odor mixture also demonstrated in principle a possible increase in the attracting action when active substances are combined.

The invention claimed is:

1. Liquid-core capsules having a mean diameter in a range between 1 and 10 mm for control of plant pests having piercing-sucking mouthparts, wherein each liquid-core capsule of the liquid-core capsules has an aqueous core and a diffusion-inhibiting, functional outer shell, wherein the core comprises at least one pest control agent and wherein the outer shell comprises at least one attractant for the pests and wherein the aqueous core comprises at least one phagostimulant.

2. The liquid-core capsules according to claim 1, wherein the outer shell comprises a base substance and an oil, wherein the base substance comprises fats and/or waxes and wherein the oil comprises a vegetable oil.

3. The liquid-core capsules according to claim 1, wherein the base substance is paraffin or soft paraffin.

4. The liquid-core capsules according to claim 2, wherein a portion of the oil in the outer shell is in a range of between 1% and 25% w/w.

5. The liquid-core capsules according to claim 2, wherein the outer shell has an outer region that is free of attractant.

6. The liquid-core capsules according to claim 1, wherein the at least one phagostimulant comprises at least one carbohydrate, at least one amino acid, at least one fat, a nutritional composition, or mixtures thereof.

7. The liquid-core capsules according to claim 1, wherein the aqueous core is enclosed by a hydrogel shell.

8. The liquid-core capsules according to claim 7, wherein the hydrogel shell is formed from a biopolymer composition comprising alginate, pectin or a mixture thereof.

9. The liquid-core capsules according to claim 8, wherein the biopolymer composition furthermore comprises additives comprising shellac, waxes or a mixture thereof.

10. The liquid-core capsules according to claim 1, wherein the at least one attractant is a volatile attractant, wherein the at least one attractant is selected from the group consisting of (Z)-3-hexenyl-acetate, (Z)-3-hexen-1-ol, (E)-β-carophyllene, 1-hexanol, nonanal, hexyl butyrate, (E)-2-hexenyl butyrate and mixtures thereof.

11. The liquid-core capsules according to claim 1, wherein the plant pests are at least one of true bugs, lice, *thrips*, and cicadas.

12. A method for manufacturing the liquid-core capsules according to claim 1, comprising the following method steps:
providing a mixture for an aqueous core of the liquid-core capsule, wherein the mixture comprises a pest control agent and at least one phagostimulant,
providing at least one mixture for a diffusion-inhibiting, functional outer shell of the liquid-core capsule, wherein the at least one mixture comprises an attractant for the pests, and
manufacturing the liquid-core capsules using the mixture for the aqueous core and the at least one mixture for the functional outer shell.

13. The method according to claim 12, further comprising providing a hydrocolloid solution,
manufacturing primary capsules, each primary capsule of the primary capsules having a hydrogel shell and an aqueous core, using the mixture for the aqueous core and the hydrocolloid solution, and
spray coating the primary capsules with the at least one mixture for the functional outer shell in a fluidized bed thereby manufacturing the liquid-core capsules.

14. A method for controlling plant pests having piercing-sucking mouthparts, comprising applying a preparation to crops, wherein the preparation comprises the liquid-core capsules according to claim 1.

15. The method according to claim 14, wherein the plant pests are at least one of true bugs, lice, *thrips*, and cicadas.

* * * * *